US012434482B2

(12) United States Patent
(10) Patent No.: US 12,434,482 B2
(45) Date of Patent: Oct. 7, 2025

Nagai et al.

(54) LIQUID EJECTION APPARATUS AND HEAD UNIT

(71) Applicant: CANON KABUSHIKI KAISHA, Tokyo (JP)

(72) Inventors: Noriyasu Nagai, Tokyo (JP); Naozumi Nabeshima, Tokyo (JP); Ryoji Inoue, Kanagawa (JP); Kyosuke Nagaoka, Tokyo (JP); Kazuya Yoshii, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 166 days.

(21) Appl. No.: 18/540,752

(22) Filed: Dec. 14, 2023

(65) Prior Publication Data

US 2024/0198684 A1 Jun. 20, 2024

(30) Foreign Application Priority Data

Dec. 20, 2022 (JP) ................................ 2022-203753

(51) Int. Cl.
*B41J 2/175* (2006.01)
*B41J 2/21* (2006.01)

(52) U.S. Cl.
CPC ......... *B41J 2/1752* (2013.01); *B41J 2/17553* (2013.01); *B41J 2/17556* (2013.01); *B41J 2/17596* (2013.01); *B41J 2/21* (2013.01)

(58) Field of Classification Search
CPC ... B41J 2/21; B41J 2/175; B41J 2/1752; B41J 2/17523; B41J 2/17553; B41J 2/17556; B41J 2/17596
See application file for complete search history.

(56) References Cited

U.S. PATENT DOCUMENTS

| | | | |
|---|---|---|---|
| 7,077,514 | B2 | 7/2006 | Inoue et al. |
| 7,104,640 | B2 | 9/2006 | Ogura et al. |
| 7,192,111 | B2 | 3/2007 | Matsumoto et al. |
| 7,290,861 | B2 | 11/2007 | Inoue et al. |
| 7,311,388 | B2 | 12/2007 | Ogura et al. |
| 7,360,876 | B2 | 4/2008 | Inoue et al. |
| 7,517,067 | B2 | 4/2009 | Inoue et al. |
| 7,607,770 | B2 | 10/2009 | Inoue et al. |
| 7,735,984 | B2 | 6/2010 | Iijima et al. |
| 7,784,927 | B2 | 8/2010 | Inoue et al. |

(Continued)

FOREIGN PATENT DOCUMENTS

| | | |
|---|---|---|
| JP | 2014-162084 | 9/2014 |

*Primary Examiner* — Anh T Vo
(74) *Attorney, Agent, or Firm* — Venable LLP

(57) ABSTRACT

A liquid ejection apparatus includes: an ejection head; a liquid reservoir; and a pressure control mechanism controlling a pressure of liquid supplied from the liquid reservoir and supplying the ejection head with liquid, the pressure control mechanism including a pressure chamber with the ejection head, a lever member connected to the valve element at a load and connectable to a pressure receiving member for a pressure of the pressure chamber at an effort, and a biasing mechanism biasing the valve element at the load of the lever member, the pressure control mechanism controlling a pressure of the pressure chamber. In the pressure control mechanism, a lever ratio, which is a ratio of a distance between the effort and fulcrum of the lever member to a distance between the load and fulcrum of the lever member, is greater than 1 and less than 5.

11 Claims, 17 Drawing Sheets

(56) References Cited

U.S. PATENT DOCUMENTS 7,950,790 B2 5/2011 Kubo et al.
8,205,974 B2 6/2012 Ogura et al.
8,313,185 B2 11/2012 Hatasa et al.
8,322,807 B2 12/2012 Seki et al.
8,469,498 B2 6/2013 Ohashi et al.
8,550,607 B2 10/2013 Inoue et al.
9,278,540 B2 3/2016 Seki et al.
9,333,758 B2 5/2016 Koshikawa et al.
9,375,938 B2 6/2016 Kondo et al.
9,597,884 B2 3/2017 Nanjo et al.
9,597,888 B2 3/2017 Takahashi et al.
9,694,585 B2 7/2017 Shiba et al.
9,724,929 B2 8/2017 Yoshii et al.
9,840,082 B2 12/2017 Nanjo et al.
9,908,338 B2 3/2018 Koshikawa et al.
9,914,305 B2 3/2018 Orihara et al.
9,914,308 B2 * 3/2018 Yamada ............... B41J 2/17563
9,975,340 B2 5/2018 Karita et al.
9,981,464 B2 5/2018 Karita et al.
10,005,287 B2 6/2018 Yamada et al.
10,029,474 B2 7/2018 Takada et al.
10,093,105 B2 10/2018 Shimamura et al.
10,112,403 B2 10/2018 Ikebe et al.
10,160,222 B2 12/2018 Shiba et al.
10,195,868 B2 2/2019 Yamada et al.
10,391,776 B2 8/2019 Hayashi et al.
10,399,346 B2 9/2019 Arai et al.
10,399,347 B2 9/2019 Miyashita et al.
10,427,412 B2 10/2019 Okude et al.
10,583,662 B2 * 3/2020 Yamada ............... B41J 2/14024
10,792,930 B2 10/2020 Yamada et al.
10,906,323 B2 2/2021 Nagaoka et al.
11,376,859 B2 7/2022 Inoue et al.
11,565,530 B2 1/2023 Fukushima et al.
11,584,132 B2 2/2023 Nagai et al.
11,685,163 B2 6/2023 Miyashita et al.
11,691,430 B2 * 7/2023 Ninagawa ............ B41J 2/17596
347/85
11,701,890 B2 7/2023 Nagai et al.
11,760,101 B2 9/2023 Nagaoka et al.
2020/0249705 A1 * 8/2020 Yoshii .................. B41J 2/17513

* cited by examiner

LIQUID EJECTION APPARATUS AND HEAD UNIT

BACKGROUND OF THE INVENTION

Field of the Invention

The present invention relates to a liquid ejection apparatus and a head unit, and more specifically, a technique of controlling a pressure of liquid supplied to an ejection head.

Description of the Related Art

As an example of this kind of technique, it is known that a pressure of liquid in an ejection opening section of an ejection head which ejects liquid such as ink is maintained at an appropriate negative pressure to stabilize liquid ejection. By maintaining liquid in an ejection opening section at an appropriate negative pressure, a stable meniscus is formed in the ejection opening section, which enables excellent ejection.

Japanese Patent Laid-Open No. 2014-162084 (hereinafter referred to as literature 1) discloses that a pressure of liquid in an ejection head is controlled by opening and closing of a valve using a lever. More specifically, a valve provided at one end of a lever is displaced by leverage gained from a force acting on the other end (effort) and based on a pressure inside a negative pressure chamber (pressure chamber). This displacement of the valve enables opening and closing of an opening between the pressure chamber and an ejection opening section of the ejection head, thereby maintaining a negative pressure in the ejection opening section within a predetermined range and enabling stable liquid ejection.

In the pressure control mechanism disclosed in literature 1, however, the pressure of the pressure chamber may largely change, which may bring about the result that the negative pressure in the ejection head cannot be maintained within the predetermined range.

For example, in the case of a so-called full-line head in which a relatively large number of ejection openings are arrayed, a relatively large amount of liquid is supplied to the head. In a case where a large amount of liquid is simultaneously supplied at the time of liquid ejection or the like, the pressure of the pressure chamber largely changes from that in other cases. Also in a case where a liquid having a relatively high viscosity is used, the pressure of the pressure chamber largely changes at the time of supply of the liquid. As a result, the pressure of liquid supplied to the ejection head cannot be maintained at a value within the predetermined range.

SUMMARY OF THE INVENTION

Therefore, a liquid ejection apparatus according to an aspect of this disclosure comprises: an ejection head configured to eject liquid; a liquid reservoir storing liquid ejected by the ejection head; and a pressure control mechanism configured to control a pressure of liquid supplied from the liquid reservoir and supply the ejection head with liquid at the controlled pressure through a liquid flow path section, the pressure control mechanism comprising a pressure chamber in liquid communication with the ejection head through the liquid flow path section, a liquid passage chamber configured to receive liquid supplied from the liquid reservoir, a valve element configured to open and close between the pressure chamber and the liquid passage chamber, a lever member connected to the valve element at a load and connectable to a pressure receiving member for a pressure of the pressure chamber at an effort, the lever member being provided rotatably about a fulcrum, and a biasing unit configured to bias the valve element in a closing direction at the load of the lever member, the pressure control mechanism being configured to control a pressure of the pressure chamber, wherein the pressure control mechanism is characterized in that a lever ratio, which is a ratio of a distance between the effort and fulcrum of the lever member to a distance between the load and fulcrum of the lever member, is greater than 1 and less than 5.

Further features of the present invention will become apparent from the following description of exemplary embodiments with reference to the attached drawings.

BRIEF DESCRIPTION OF THE DRAWINGS

FIGS. 17A and 1B are diagrams illustrating an embodiment in which a pressure receiving area of a movable valve is changed.

DESCRIPTION OF THE EMBODIMENTS

Embodiments of the present invention will be described below in detail with reference to the accompanying drawings.

It should be noted that the following description only shows examples and is not intended to restrict the scope of the present invention. For example, although the following description shows an example of a thermal ejection head which generates bubbles and ejects liquid by means of a heating element, it is understandable from the following description that the present invention is also applicable to an ejection head adopting other liquid ejection methods such as a piezoelectric method.

Further, although a liquid ejection apparatus of a type of circulating ink between an ink tank and an ejection head will be described as an example, the liquid ejection apparatus may be of other types. For example, a pressure control mechanism of the present invention is also applicable to the type of not circulating ink but providing two tanks upstream and downstream of an ejection head, respectively, and feeding ink from one tank to the other tank to cause ink to flow through a pressure chamber. Similarly, the pressure control mechanism of the present invention is also applicable to an apparatus adopting a so-called serial ejection head which performs printing while scanning a medium, instead of a so-called full-line head according to the following embodiments.

Summary of Inkjet Printing Apparatus

Figure 1:
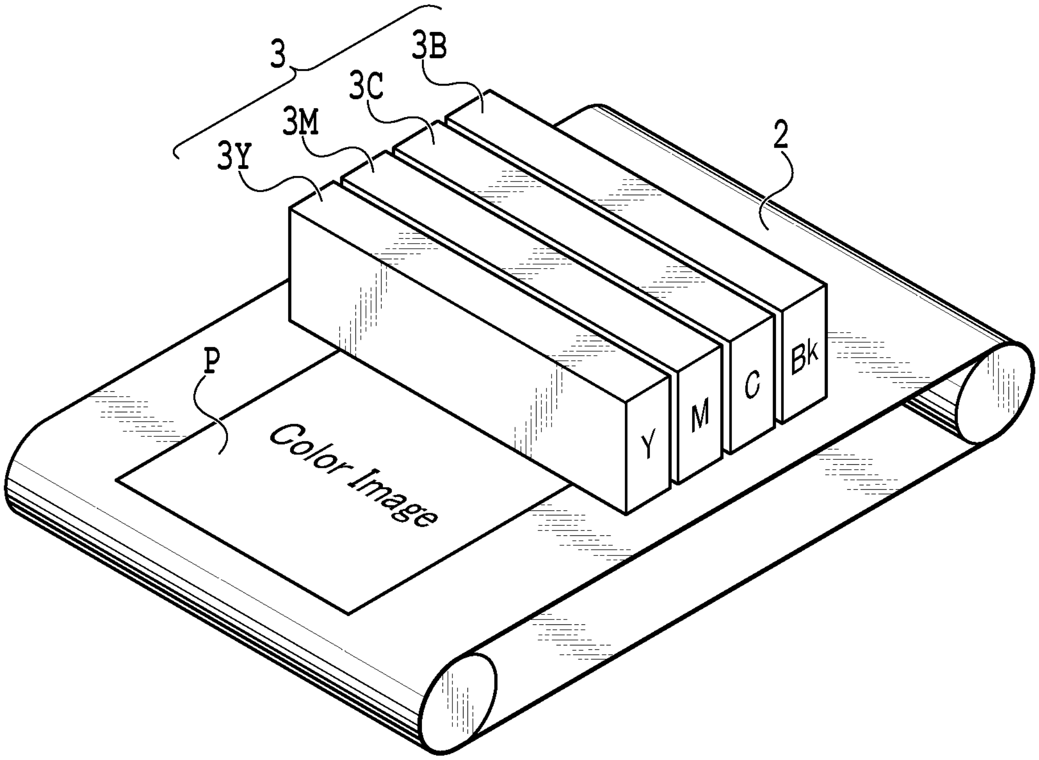
FIG. 1 is a perspective view schematically showing a general configuration of an inkjet printing apparatus according to an embodiment of a liquid ejection apparatus of the present invention.

FIG. 1 is a perspective view schematically showing a general configuration of an inkjet printing apparatus (hereinafter also referred to as a printing apparatus) according to an embodiment of a liquid ejection apparatus of the present invention. As mechanical operation mechanisms, the printing apparatus of the present embodiment comprises a conveying belt 2 which conveys a print medium P such as a sheet and a head unit 3 comprising a so-called full-line ejection head in which ejection openings are arrayed to correspond to the width of a conveyed print medium P. The printing apparatus of the present embodiment is configured such that the head unit 3 is attachable to and detachable from the apparatus body and can be removably used. The head unit 3 includes head units 3Y, 3M, 3C, and 3B for respective ejected ink colors, yellow (Y), magenta (M), cyan (C), and black (Bk). The conveying belt 2 is driven and moved by an unshown driving mechanism to convey, for example, a magnetically-adsorbed print medium P. During the conveyance, the ejection heads of the respective head units 3Y, 3M, 3C, and 3B eject the corresponding inks according to print data to print a character or image on the print medium P. The illustrated example shows that the characters "Color Image" have been printed in a color on the print medium P. The above printing operation is performed by an unshown control unit sending power and an ejection control signal to each of the ejection head of the head unit and a drive unit for belt conveyance.

Incidentally, the print medium is not limited to a cut sheet in this example and may have a different form such as a continuous roll sheet depending on the type of the printing apparatus. Further, the print medium is not limited to paper and may be a film or the like.

Ink Circulation System

Figure 2:
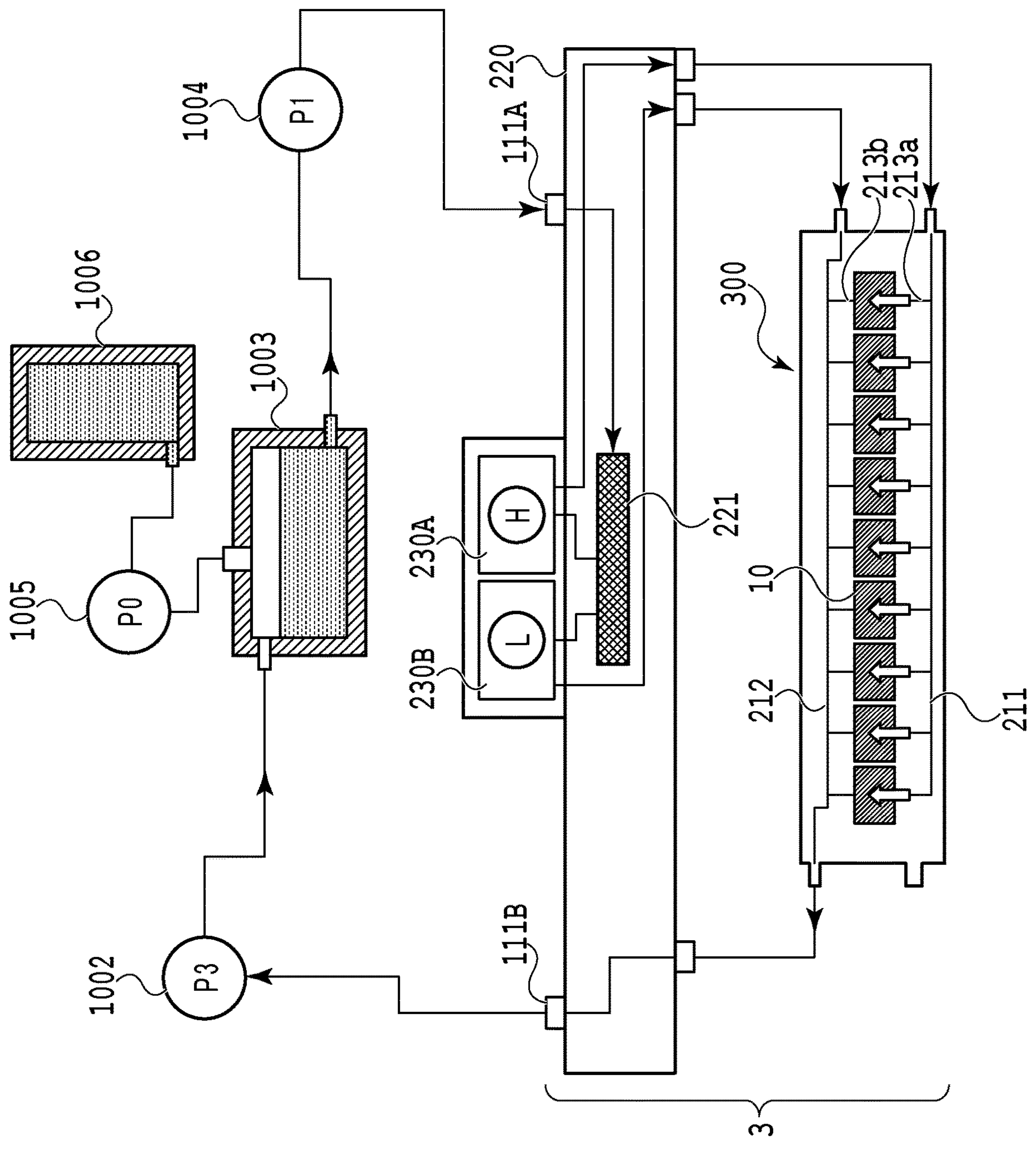
FIG. 2 is a schematic view showing an ink circulation configuration of the inkjet printing apparatus according to the embodiment.

FIG. 2 is a schematic view showing an ink (liquid) circulation configuration of the inkjet printing apparatus according to the present embodiment. Since the head units for Y, M, C, and B inks and their ink circulation configurations are identical, the head unit 3 for one ink color and its ink circulation configuration will be described unless otherwise specified.

As shown in FIG. 2, in the ink circulation configuration of the present embodiment, ink stored in a buffer tank (hereinafter also referred to as "liquid reservoir") 1003 is supplied to the head unit 3 by a second circulating pump 1004. The ink is returned from the head unit 3 to the buffer tank 1003 by a first circulating pump 1002. In a case where the ink in the buffer tank 1003 is consumed by ink ejection in the head unit 3, ink is transferred from a main tank 1006 to the buffer tank 1003 by a replenishing pump 1005 and the buffer tank 1003 is replenished with ink. Incidentally, the buffer tank 1003 as a sub-tank comprises an air communication port (not shown) which establishes communication between the inside and outside of the tank such that ink bubbles can be discharged to the outside, thereby maintaining the inside of the tank at an appropriate pressure.

The head unit 3 comprises an ejection head (hereinafter also simply referred to as "head") 300 and a liquid supply unit 220. The liquid supply unit 220 comprises two negative pressure control units (pressure control units) 230A and 230B. As will be described later in detail with reference to FIGS. 10A to 10D and the like, the negative pressure control unit 230A applies a relatively high pressure to ink circulating in the head 300 and the negative pressure control unit 230B applies a relatively low pressure to ink circulating in the head 300. A pressure difference made by pressure control of these units can produce an ink circulation in the head 300.

The liquid supply unit 220 also comprises two liquid connection portions 111A and 111B, through which ink is sent to and received from the buffer tank 1003. That is, ink is supplied from the buffer tank 1003 to the liquid supply unit 220 by the second circulating pump 1004 through the liquid connection portion 111A. The supplied ink passes through a filter 221 provided in the liquid supply unit 220 and is transferred to the negative pressure control units 230A and 230B. The ink is returned from the liquid supply unit 220 to the buffer tank 1003 by the first circulating pump 1002 through the liquid connection portion 111B. The liquid supply unit 220 further comprises liquid connection portions to send ink to and receive ink from an ink circulation path of the head 300. Through these liquid connection portions, the negative pressure control unit 230A can apply a relatively high pressure to ink in a common supply flow path 211 of the head 300 and the negative pressure control unit 230B can apply a relatively low pressure to ink in a common collection flow path 212 of the head 300.

The ejection head 300 comprises a pressure generation chamber (not shown in FIG. 2) provided with a heater for each ejection opening. The ejection head 300 also comprises individual supply flow paths 213*a* for supplying ink from the common supply flow path 211 to the respective pressure generation chambers and individual collection flow paths 213*b* for transferring ink from the respective pressure generation chambers to the common collection flow path 212.

In the ink circulation configuration through the above liquid flow path section, the negative pressure control units 230A and 230B can make a pressure difference in ink supplied to the head 300 and produce an ink circulation necessary for ink ejection. This ink circulation also makes it possible to discharge heat generated by the heaters along with ejection to the outside of the head 300. Further, while the ejection head 300 performs printing, an ink flow (liquid flow) can be produced also in an ejection opening or pressure generation chamber not performing printing and ink thickening can be suppressed there. Moreover, thickened ink or foreign matter in ink can be discharged into the common collection flow path 212. Accordingly, the ejection head 300 of the present embodiment enables high-speed and high-quality printing.

In the above configuration, as will be described with reference to FIGS. 10A to 10D and the like, the pressure control units 230A and 230B are provided between the second circulating pump 1004 and the ejection head 300. Thus, even in a case where a flow rate in the ink circulation path changes with a difference in duty for printing, a pressure on a downstream side of the pressure control units 230A and 230B (i.e., on the ejection head 300 side) can be maintained at a pressure within a preset predetermined range. Incidentally, in order to control the pressure value of an ejection opening section pressure chamber of the head 300 with high accuracy, it is preferable to reduce a change in pressure in a flow path from the pressure control units 230A and 230B to the pressure chambers. Thus, it is better to locate the pressure control units closer to the pressure generation chambers. It is therefore preferable that the pressure control units 230A and 230B be mounted on the head unit 3.

Head Unit

Figure 3A:
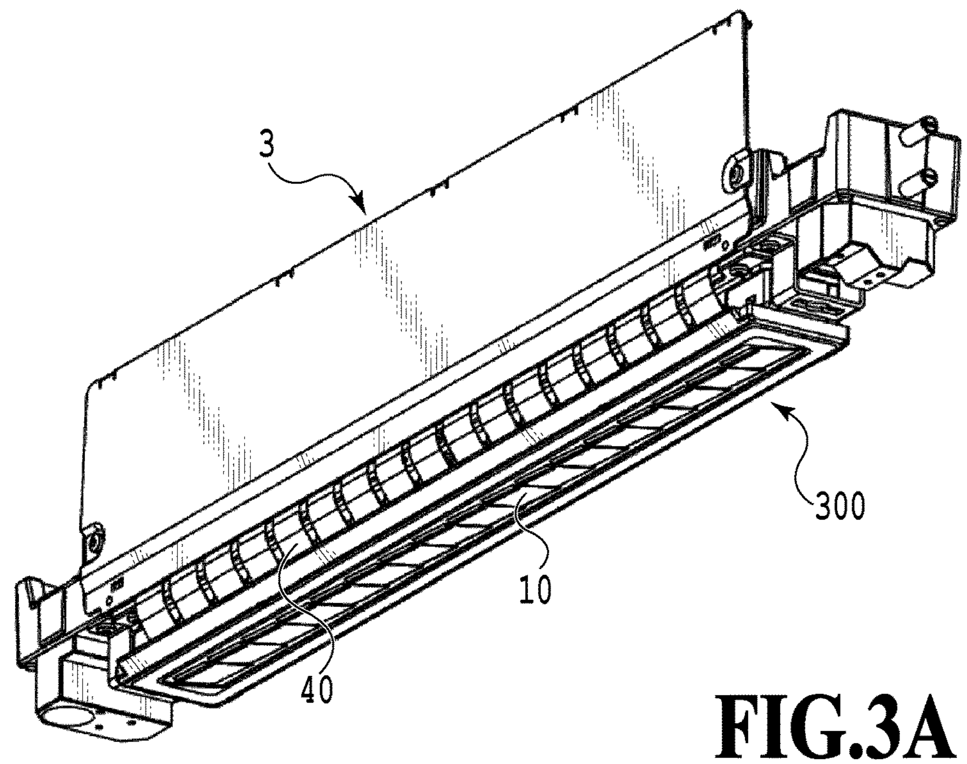
FIGS. 3A and 3B are perspective views showing a head unit according to the embodiment.
Figure 3B:
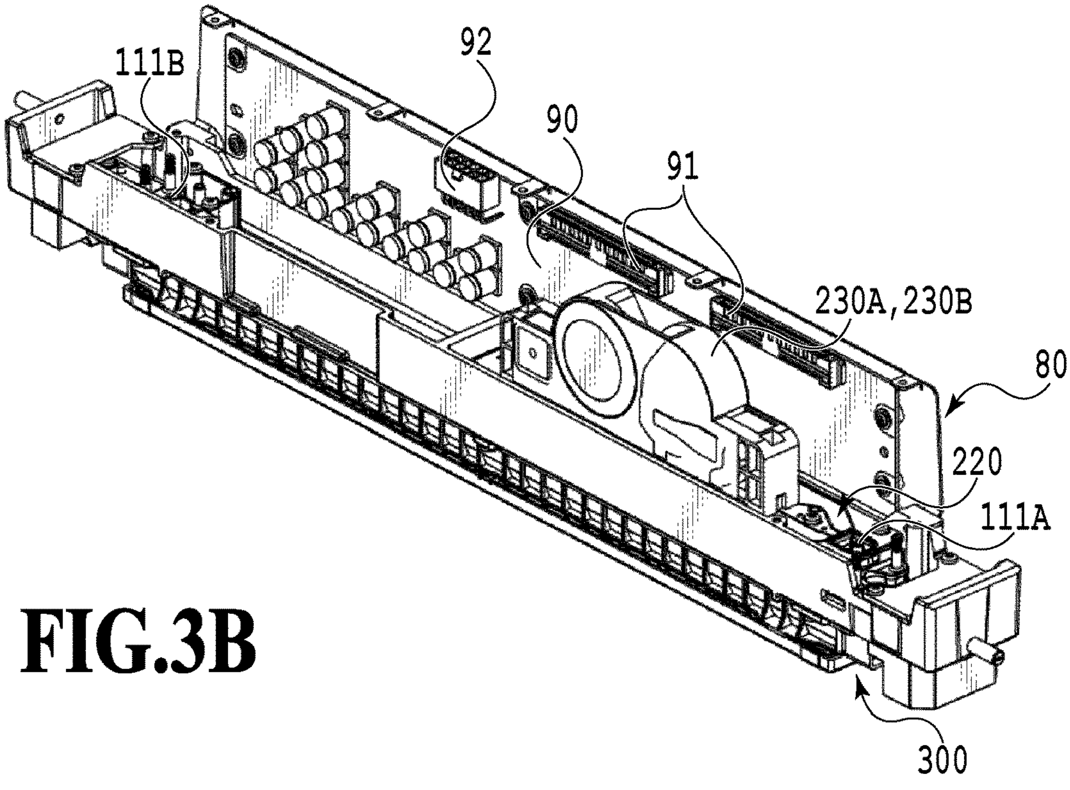

FIGS. 3A and 3B are perspective views showing the head unit 3 according to the present embodiment. As shown in FIG. 3A, the ejection head 300 of the head unit 3 is formed by 17 printing element boards 10 arrayed linearly (arranged in line), each printing element board 10 comprising an ejection opening, a heater for generating ejection energy, and the like. The head unit 3 comprises flexible printed circuit boards 40 and an electric wiring board 90 which are electrically connected to the printing element boards 10, and signal input terminals 91 and a power supply terminal 92 which are electrically connected to the boards. The signal input terminals 91 and power supply terminal 92 are electrically connected to the control unit of the printing apparatus and supply an ejection drive signal and power necessary for ejection, respectively, to the printing element boards 10. Since wiring is concentrated by an electric circuit in the electric wiring board 90, the number of the signal input terminals 91 and power supply terminal 92 can be less than the number of printing element boards 10. This can save the number of electric connecting portions to be disconnected at the time of mounting of the head unit 3 on the printing apparatus or replacement of the head unit 3. As shown in FIG. 3B, the liquid supply unit 220 is provided with the pressure control units 230A and 230B in which high-pressure and low-pressure pressure control mechanisms are integrally formed. As will be described later with reference to FIG. 10D, in the pressure control units 230A and 230B, elements such as pressure chambers are integrated while they are opposite in direction and adjacent to each other. As described above with reference to FIG. 2, the liquid connection portions 111A and 111B provided on the respective ends of the head unit 3 are connected to the liquid circulation system of the printing apparatus. Thus, inks of four colors C, M, Y, and Bk are supplied from a supply system of the printing apparatus to the head unit 3 and collected to the supply system of the printing apparatus through the head unit 3.

Figure 4:
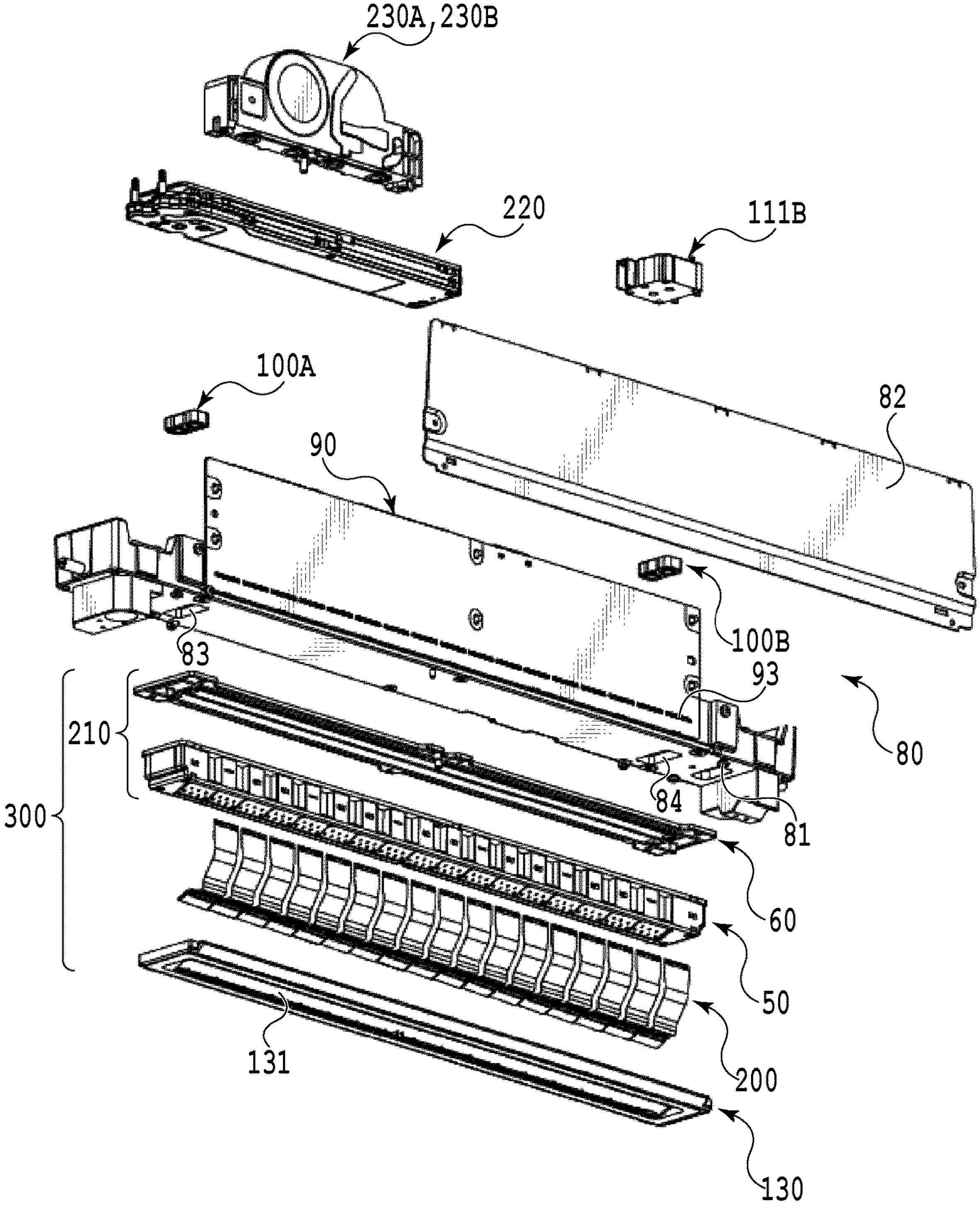
FIG. 4 is an exploded perspective view of parts or units forming the head unit 3 shown in FIG. 1.

FIG. 4 is an exploded perspective view of parts or units forming the head unit 3. The ejection head 300, liquid supply unit 220, and electric wiring board 90 are attached to a casing 80. The liquid supply unit 220 is provided with the filter 221 (FIG. 2) to communicate with the liquid connection portions 111A and 111B (FIGS. 2, 3A, and 3B) and remove foreign matter from supplied ink. The pressure control units 230A and 230B are units formed by high-pressure and low-pressure pressure regulating valves, respectively, to attenuate a pressure drop change by the action of lever-equipped valves, springs, and the like provided therein. That is, a pressure drop change of the supply system upstream of the head unit 3 caused by a change in liquid flow rate is attenuated and a negative pressure change on a downstream side of the pressure control units 230A and 230B (on the ejection head 300 side) is maintained within a certain range.

The casing 80 includes a liquid ejection unit supporting portion 81 and an electric wiring board supporting portion 82 to support the ejection head 300 and electric wiring board 90 and ensure the rigidity of the head unit 3. The electric wiring board supporting portion 82 supports the electric wiring board 90 and is screwed onto the liquid ejection unit supporting portion 81. The liquid ejection unit supporting portion 81 corrects warping or deformation of the ejection head 300 and ensure the accuracy of relative positions of the printing element boards 10, thereby reducing streaks or unevenness in a printed article. It is therefore preferable that the liquid ejection unit supporting portion 81 have sufficient rigidity. An example of the preferred material is a metal material such as SUS or aluminum or ceramic such as alumina. The liquid ejection unit supporting portion 81 is provided with openings 83 and 84 to insert joint rubbers 100A and 100B. Liquid supplied from the liquid supply unit 220 is guided to a third flow path member forming the ejection head 300 through the joint rubbers.

The ejection head 300 comprises a plurality of ejection modules 200 and a flow path member 210. A cover member 130 is attached to a surface of the ejection head 300 facing a print medium. Here, the cover member 130 is a member having a frame-like surface with an elongate opening 131. The printing element board 10 and a sealing member 110 (FIG. 7) included in the ejection module 200 are exposed from the opening 131. The frame portion around the opening 131 functions as an abutting surface for a cap member which caps the ejection head 30 in a print standby state. Thus, it is preferable to apply an adhesive, sealant, filler or the like around the opening 131 to fill projections and gaps on the ejection opening surface of the ejection unit 300 such that a closed space is formed at the time of capping.

The flow path member 210 included in the ejection head 300 is formed by stacking a first flow path member 50 and a second flow path member 60. The ejection modules 200 are bonded to a bonding surface of the first flow path member 50 with an adhesive. The flow path member 210 has a flow path configuration to distribute ink supplied from the liquid supply unit 220 to each ejection module 200 and return liquid circulated from the ejection module 200 to the liquid supply unit 220. The flow path member 210 is screwed onto the liquid ejection unit supporting portion 81.

Figure 5A:
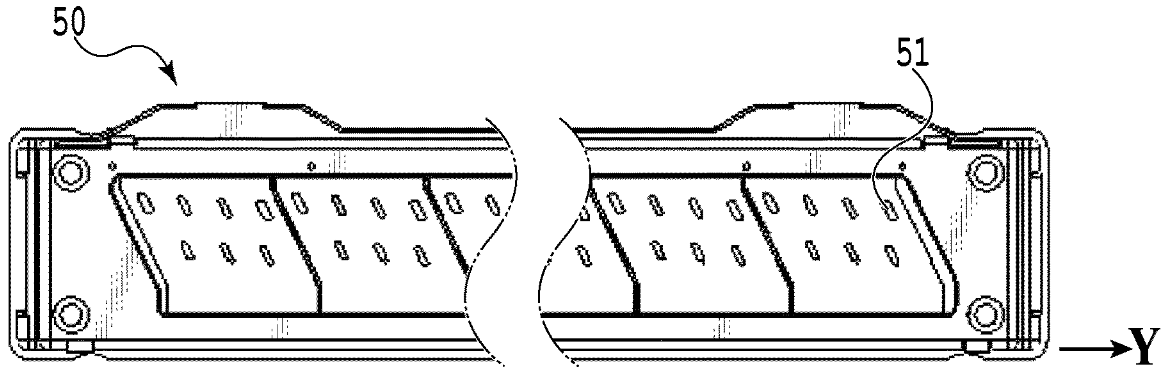
FIGS. 5A to 5C are plan views for illustrating a detailed configuration of a flow path member forming the ejection head shown in FIG. 4.
Figure 5B:
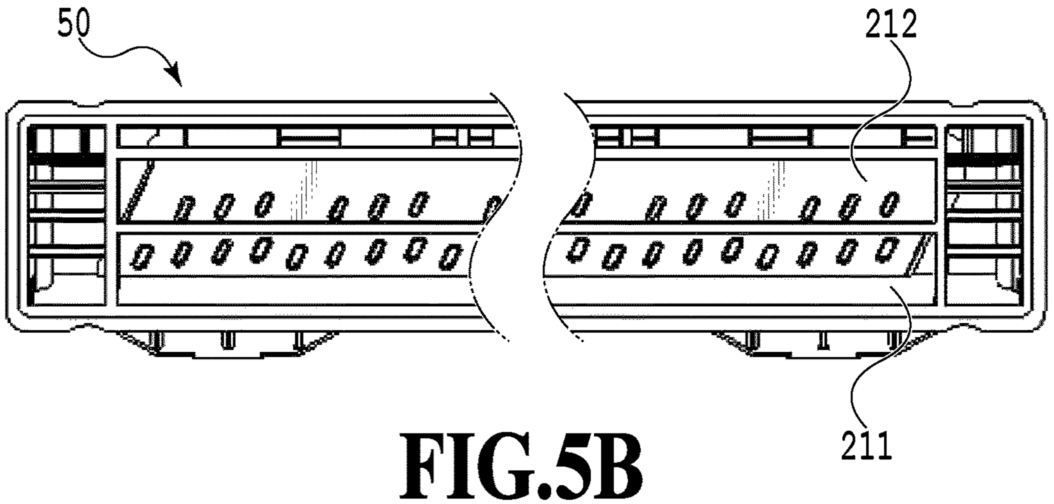
Figure 5C:
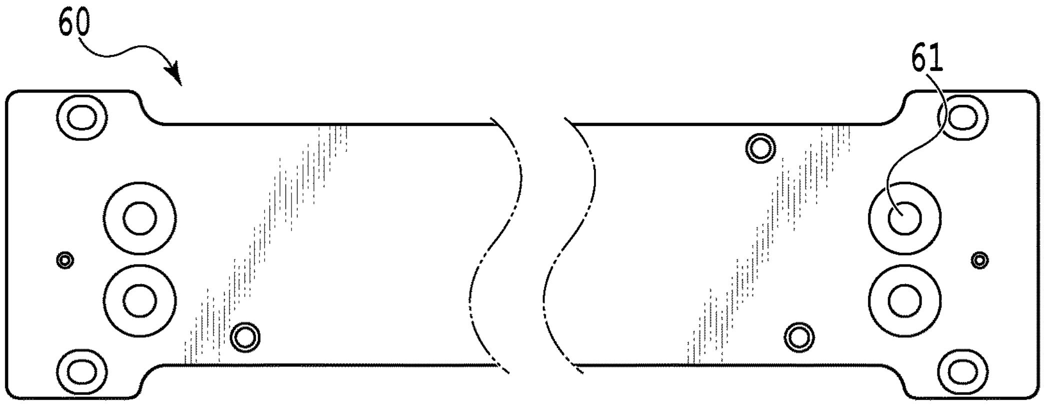

FIGS. 5A to 5C are plan views for illustrating a detailed configuration of the flow path member 210 forming the ejection head 300. FIGS. 5A and 5B show front and back surfaces of the first flow path member 50 and FIG. 5C shows a front surface of the second flow path member 60. The front surface of the first flow path member 50 abuts on the printing element boards 10 and the back surface of the second flow path member 60 abuts on the liquid supply unit 220. The back surface of the first flow path member 50 shown in FIG. 5B abuts on the front surface of the second flow path member 60 shown in FIG. 5C.

As shown in FIG. 5A, the first flow path member 50 has a plurality of unit patterns arrayed repeatedly in a Y direction (a direction orthogonal to a print medium conveying direction), each unit pattern consisting of an array of four communication openings 51 and an array of three communication openings 51. One printing element board 10 corresponds to one unit pattern. Here, the surface of the first flow path member 50 abutting on the printing element boards 10 is fluidly connected to the printing element boards 10 and the communication openings 51 form the individual supply flow paths 213*a* and individual collection flow paths 213*b* described above with reference to FIG. 2. As shown in FIGS. 5B, the first flow path member 50 is provided with common flow path grooves extending in the Y direction and forming the common supply flow path 211 and the common collection flow path 212. As shown in FIG. 5C, the second flow path member 60 is provided with common communication openings 61 are formed at respective ends of each common flow path groove and fluidly communicate with the liquid supply unit 220.

Figure 6A:
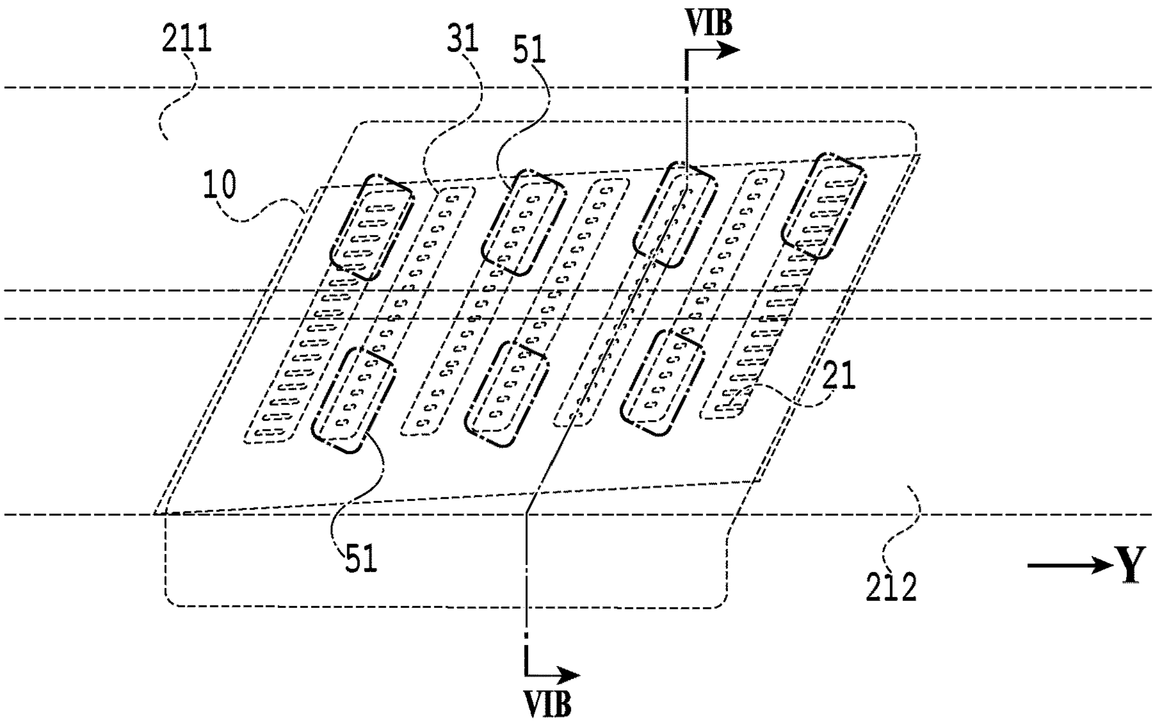
FIGS. 6A and 6B are a transparent view and a cross-sectional view for illustrating a flow path structure formed inside the flow path member.
Figure 6B:
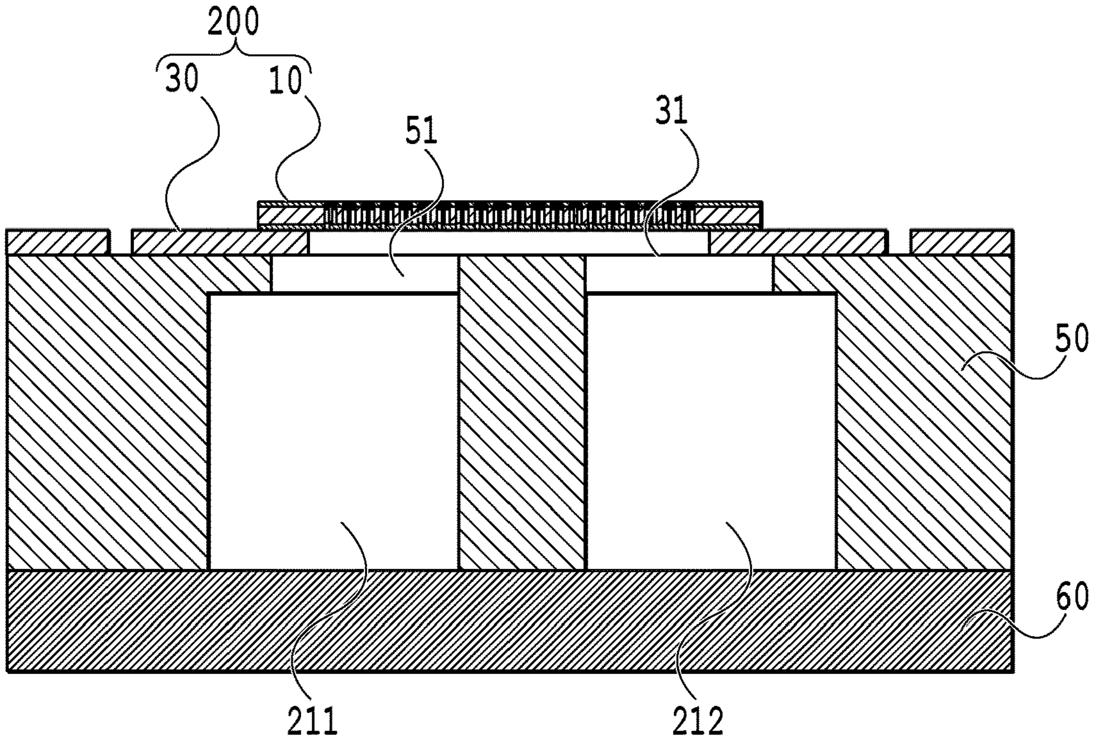

FIGS. 6A and 6B are a transparent view and a cross-sectional view for illustrating the flow path structure formed inside the flow path member 210. FIG. 6B is a cross-sectional view along line VIB-VIB in FIG. 6A.

The common supply flow path 211 and common collection flow path 212 extending in the longitudinal direction (Y direction) of the first flow path member 50 are fluidly connected to openings 21 (see FIGS. 8A, 8B, and 8C) of the printing element boards 10 through the communication openings 51 of the first flow path member 50 and liquid supply openings 31 of a supporting member 30, respectively.

As described above, the common supply flow path 211 is connected to the relatively high-pressure pressure control unit 230A and the common collection flow path 212 is connected to the relatively low-pressure pressure control unit 230B. The common communication openings 61 (see FIGS. 5A to 5C), common supply flow path 211, communication openings 51 (individual supply flow paths 213*a*), and printing element boards 10 form an ink supply path to the printing element boards 10. Similarly, the printing element boards 10, communication openings 51 (individual collection flow paths 213*b*), common collection flow path 212, and common communication openings 61 (see FIGS. 5A to 5C) form an ink collection path. In this ink circulation path, an ejection operation is performed in the printing element boards 10 according to ejection data, and part of the supplied ink not consumed by the ejection operation is collected through the ink collection path.

Ejection Module

Figure 7A:
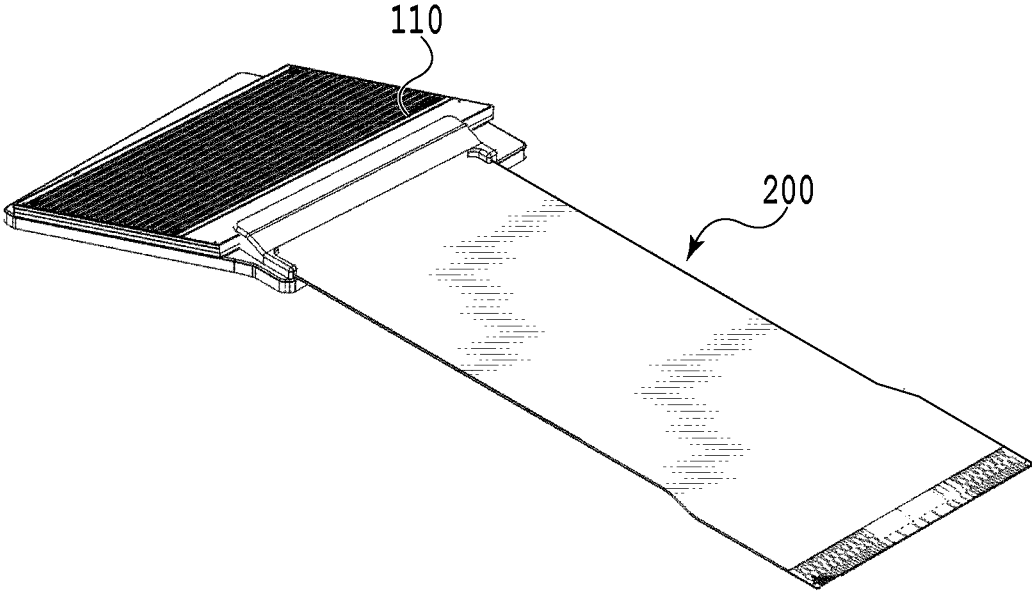
FIGS. 7A and 7B are a perspective view and an exploded perspective view for illustrating an ejection module.
Figure 7B:
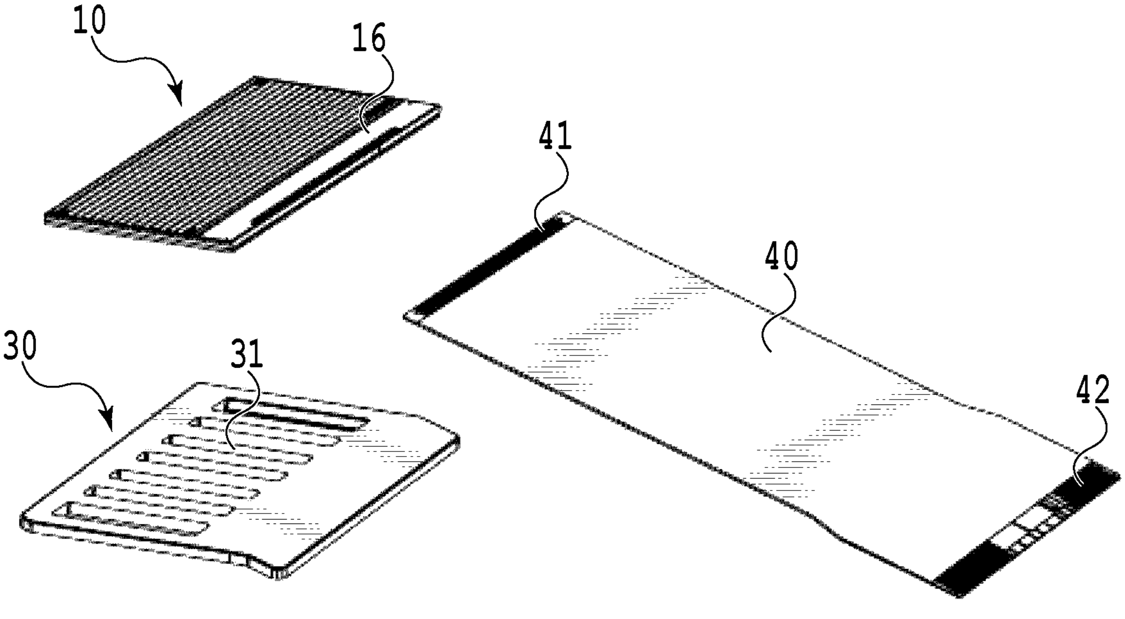

FIGS. 7A and 7B are a perspective view and an exploded perspective view for illustrating the ejection module 200. In the manufacture of the ejection module 200, the printing element board 10 and the flexible printed circuit board 40 are first bonded to the supporting member 30 in which the liquid communication openings 31 have been formed in advance. After that, a terminal 16 on the printing element board 10 is electrically connected to a terminal 41 on the flexible printed circuit board 40 by wire bonding and the wire-bonded portion (electric connecting portion) is then covered and sealed with the sealing member 110. A terminal 42 of the flexible printed circuit board 40 opposite to the printing element board 10 is electrically connected to a connecting terminal 93 of the electric wiring board 90 (see FIG. 4). The supporting member 30 is a support body that supports the printing element board 10 and also a flow path member that establishes fluid communication between the printing element board 10 and the flow path member 210. Thus, it is preferable that the supporting member 30 have a high degree of flatness and be capable of being joined to the printing element board with sufficiently high reliability. As the material, for example, alumina or resin material is preferable.

Printing Element Board

Figure 8A:
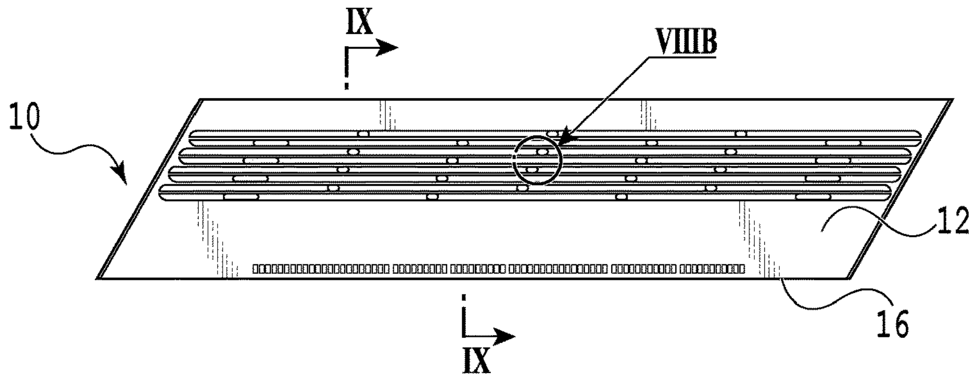
FIGS. 8A, 8B, and 8C are a plan view, an enlarged view, and a plan view illustrating a printing element board.
Figure 8B:
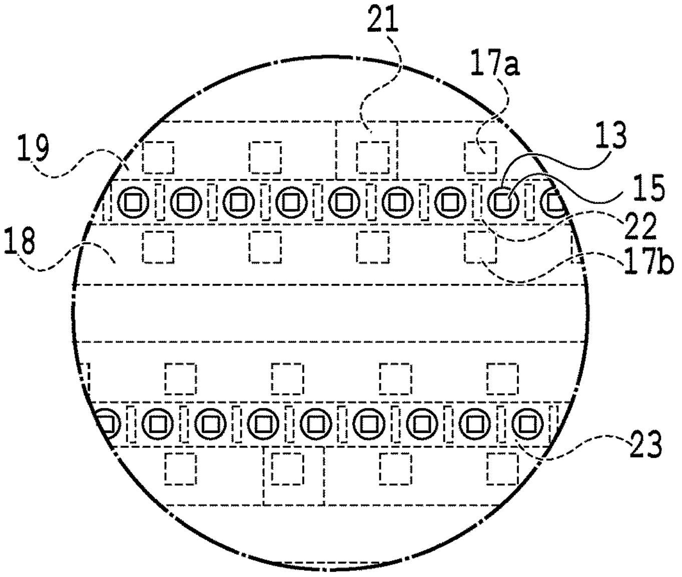
Figure 8C:
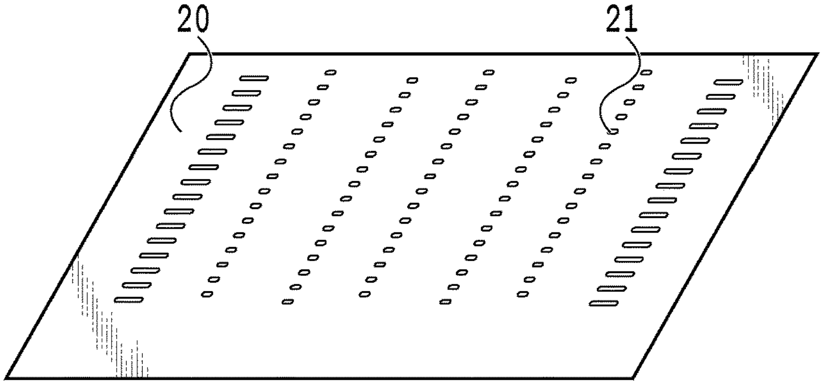

FIGS. 8A, 8B, and 8C are a plan view, an enlarged view, and a plan view illustrating the printing element board 10. FIG. 8A shows a surface of the printing element board 10 in which ejection openings are formed. FIG. 8B shows an enlarged view of a portion shown by VIIIB in FIG. 8A. FIG. 8C shows a surface of the printing element board 10 opposite to FIG. 8A.

In the example shown in FIG. 8A, four ejection opening arrays are formed in an ejection opening forming member 12 of the printing element board 10. These four ejection opening arrays have different array pitches of ejection openings, whereby the four ejection opening arrays as a whole have an ejection opening array density of 1200 dpi in the Y direction, for example. As a matter of course, the array configuration of the ejection openings is not limited to this example. Incidentally, a direction of extension of the ejection orifice array in which a plurality of ejection openings 13 are arrayed will be also hereinafter referred to as "ejection opening array direction." As shown in FIG. 8B, a heater (heating element) 15 for producing heat energy and thereby causing liquid to bubble is arranged at a position corresponding to each ejection opening 13. Partitions 22 define the printing elements 15 and the pressure generation chambers 23 including the printing elements 15 therein. The heating element 15 is electrically connected to the terminal 16 via electric wiring (not shown) provided on the printing element board 10. The heating element 15 generates heat and brings liquid to a boil based on a pulse signal input from a control circuit of the printing apparatus via the electric wiring board 90 (see FIG. 4) and the flexible printed circuit board 40 (see FIGS. 7A and 7B). The force of bubble generation by this boiling is used to eject ink from the ejection opening 13. As shown in FIG. 8B, a liquid supply path 18 extends along one side of each ejection opening array and a liquid collection path 19 extends along the other side. The liquid supply path 18 and the liquid collection path 19 are flow paths provided in the printing element board 10 and extending in the ejection opening array direction, and communicate with the ejection openings 13 via supply openings 17*a* and collection openings 17*b*, respectively.

As shown in FIG. 8C, a sheet-like cover plate 20 is stacked on a surface of the printing element board 10 opposite to the surface in which the ejection openings 13 are formed. The cover plate 20 is provided with a plurality of openings 21 (in the form of opening arrays) communicating with the liquid supply path 18 and the liquid collection path 19. In the embodiments, the cover plate 20 is provided with three openings 21 for each liquid supply path 18 and two openings 21 for each liquid collection path 19. However, the number of openings is not limited to this. Each opening 21 in the cover plate 20 communicates with the plurality of communication openings 51 shown in FIG. 5A. It is preferable that the cover plate 20 be sufficiently resistant to corrosion by liquid. Further, high accuracy is required for the shape and positions of the openings 21. It is therefore preferable to use a photosensitive resin material or silicon plate as the material for the cover plate 20 and provide the openings 21 by a photolithographic process.

Figure 9:
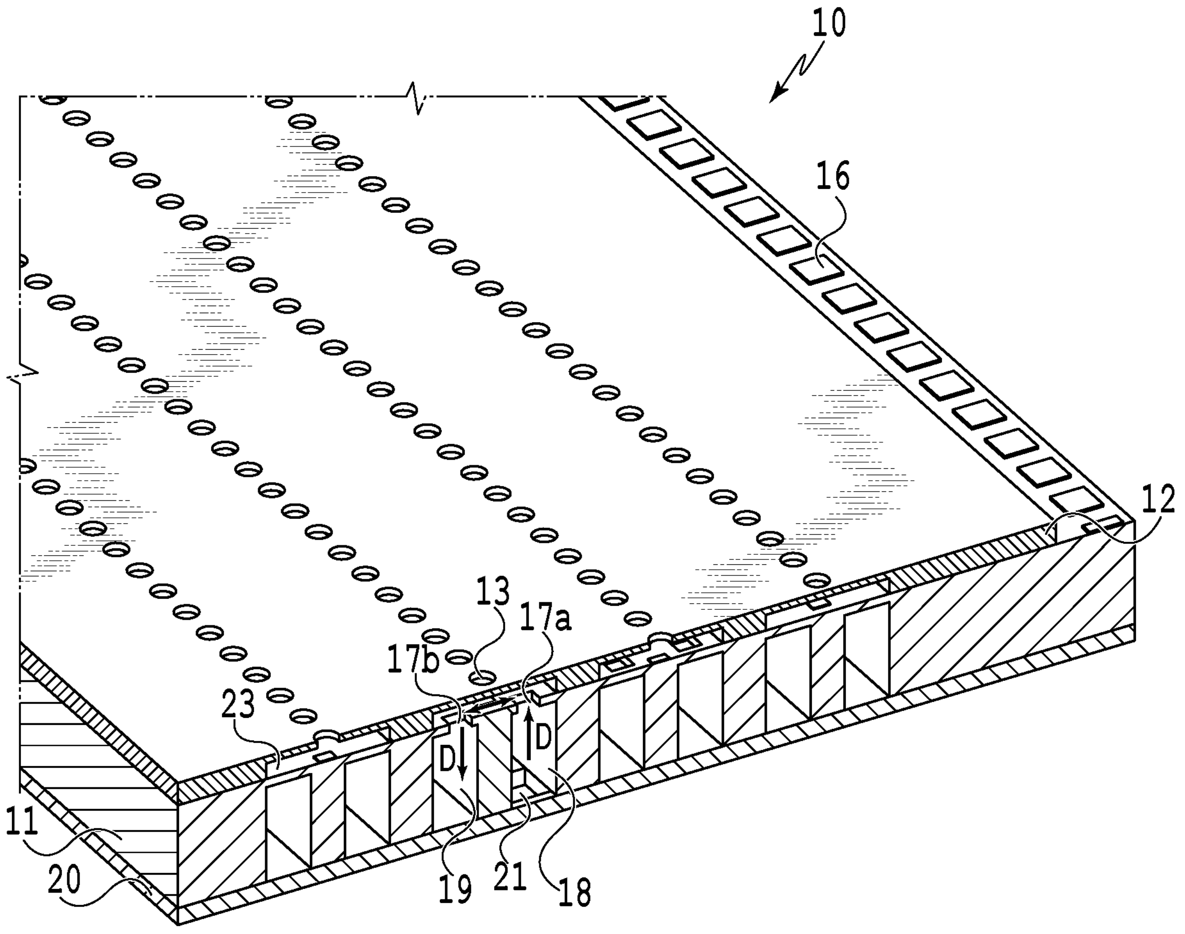
FIG. 9 is a perspective view showing a cross section along line IX-IX in FIG. 8A.

FIG. 9 is a perspective view showing a cross section along line IX-IX in FIG. 8A and shows the cross section of the printing element board 10 and the cover plate (cover member) 20. The cover plate 20 has the function of a cover forming part of the walls of the liquid supply path 18 and the liquid collection path 19 formed in a substrate 11 of the printing element board 10. In the printing element board 10, the substrate 11 formed of Si and the ejection opening forming member 12 formed of a photosensitive resin are laminated, and the cover plate 20 is joined to the back surface of the substrate 11. One surface of the substrate 11 is provided with the heating elements 15 (see FIGS. 8A, 8B, and 8C) and the opposite surface thereof is provided with grooves to form the liquid supply paths 18 and liquid collection paths 19 extending along the ejection opening arrays. The liquid supply path 18 and liquid collection path 19 formed by the substrate 11 and cover plate 20 are connected to the common supply flow path 211 and common collection flow path 212 in the flow path member 210, respectively. Here, a differential pressure is produced between the liquid supply path 18 and the liquid collection path 19 by the pressure control units 230A and 230B. While liquid is ejected from the ejection openings 13 to perform printing, in an ejection opening not performing ejection, the differential pressure causes liquid to flow from the liquid supply path 18 provided in the substrate 11 into the liquid collection path 19 through the supply opening 17*a*, the pressure generation chamber 23, and the collection opening 17*b* (arrows D in FIG. 9). This flow makes it possible to collect thickened ink caused by evaporation from the ejection opening 13, bubbles, foreign matter, and the like to the liquid collection path 19 from around the ejection opening 13 and pressure generation chamber 23 not performing the ejection operation. Further, ink thickening and increase in density of color material can be suppressed around the ejection opening 13 or pressure generation chamber 23. The liquid collected to the liquid collection path 19 is collected through the opening 21 of the cover plate 20 and the liquid supply opening 31 of the supporting member 30 in the order of the liquid supply opening 31 in the supporting member 30, the communication opening 51 in the first flow path member 50, and the common collection flow path 212, and is collected to the collection path of the printing apparatus (FIG. 2).

Pressure Control Unit

Figure 10A:
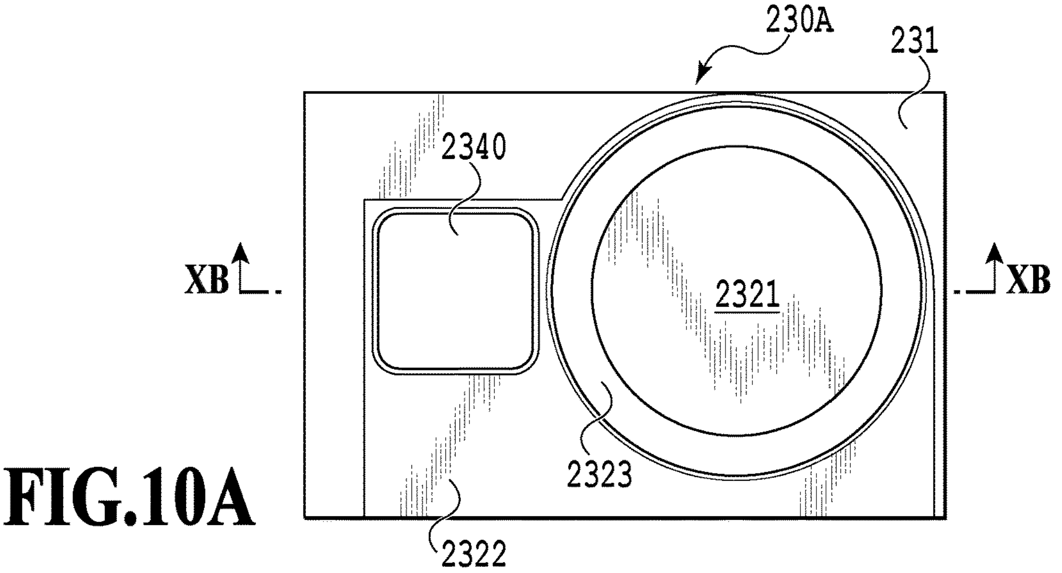
FIGS. 10A to 10D are diagrams showing a structure of pressure control units according to an embodiment of the present invention.
Figure 10B:
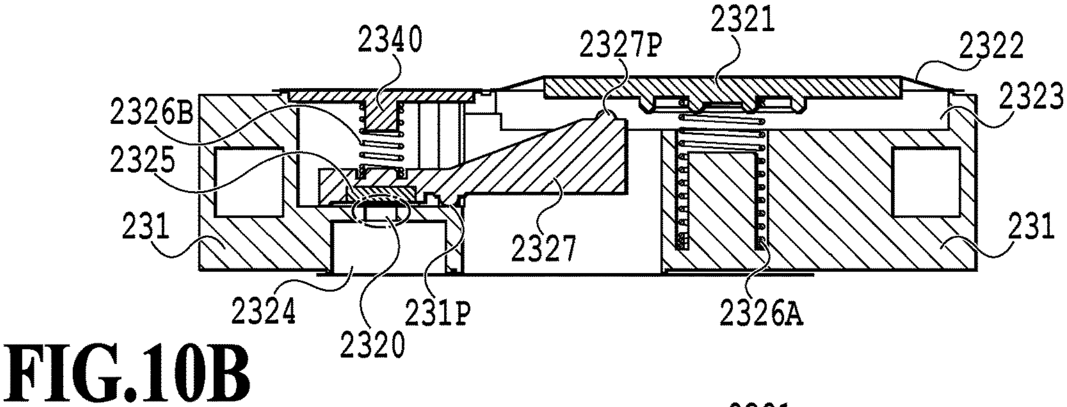
Figure 10C:
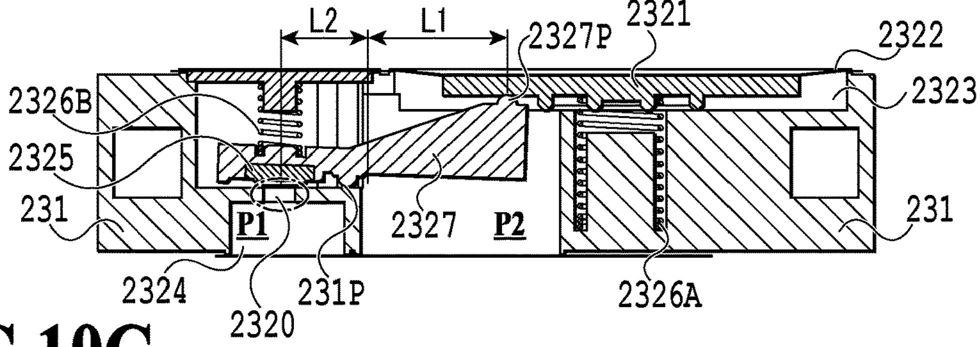

FIGS. 10A to 10D are diagrams showing a structure of the pressure control unit 230A (pressure reducing valve) according to an embodiment of the present invention. FIG. 10A shows the appearance of the pressure control unit 230A. FIGS. 10B and 10C show a cross section along line XB-XB in FIG. 10A. FIG. 10B shows a state in which a movable valve 2325 is closed and FIG. 10C shows a state in which the movable valve 2325 is open. Incidentally, since the pressure control unit 230B is identical in structure to the pressure control unit 230A, the following description focuses on the pressure control unit 230A.

The principle of operation of the pressure control unit 230A is the same as that of a so-called "pressure reducing regulator." As shown in FIGS. 10B and 10C, an orifice 2320 forming a valve mechanism is opened and closed by the movable valve (valve element) 2325 provided at one end of a lever (lever member) 2327. That is, the other end of the lever 2327 is provided with a projecting portion 2327A. This projection can be connected to a pressure receiving plate (pressure receiving member) 2321 by the rotation of the lever. The projection functions as an effort by this connection. In the lever 2327, a point 231P on a structure member (casing) of the pressure control unit 230A acts as a fulcrum and the aforementioned movable valve functions as a load. The lever 2327 is provided inside a pressure chamber 2323. The pressure receiving plate 2321 defines the pressure chamber 2323 and moves vertically according to the relationship between the elastic force of a spring 2326A and the pressure of the pressure chamber 2323. The lever 2327 is also connected to a spring 2326B vertically above the movable valve 2325, and the spring 2326B is held by a holding plate 2340. The above actuator for the lever 2327 allows the lever 2327 to rotate around the fulcrum 231P. The pressure receiving plate 2321 and the holding plate 2340 are covered and sealed with a flexible film 2322.

In the pressure control unit 230A described above, a liquid passage chamber 2324 is in ink communication with the second pump 1004 through an upstream flow path (not shown), the liquid connection portion 111A, and the like, whereby the liquid passage chamber 2324 receives ink pressurized to a predetermined pressure. On the other hand, the pressure chamber 2323 of the pressure control unit 230A communicates with the common supply flow path 211 of the ejection head 300 through a downstream flow path (not shown) of the liquid supply unit and the like. Accordingly, an ink pressure (P2) determined as will be described below in the pressure chamber 2323 can be transferred as an ink pressure of the common supply flow path 211. This configuration also applies to the pressure control unit 230B except that the pressure chamber of the pressure control unit 230B communicates with the common collection flow path 212 of the ejection head 300 through a downstream flow path (not shown). As a result, a pressure determined in the pressure chamber 2323 of the pressure control unit 230A can be a relatively high pressure, a pressure determined in the pressure chamber of the pressure control unit 230B can be a relatively low pressure, and a predetermined pressure difference can be produced between the common supply flow path 211 and the common collection flow path 212.

In FIGS. 10B and 10C, as described above, the lever 2327 is provided rotatably about the fulcrum 231P located at the predetermined position in the structure member of the pressure control unit 230A. On the other hand, the pressure receiving plate 2321 is biased upward by a biasing unit (spring 2326A) and the movable valve 2325 provided at the end of the lever 2327 is biased downward by a different biasing unit (spring 2326B). Thus, in the relative positional relationship between the pressure plate 2321 and the lever 2327, in a case where the pressure plate 2321 does not abut on the lever 2327 (for example, FIG. 10B), the movable valve 2325 contacts and closes the orifice 2320. Under normal conditions, the movable valve 2325 is closed as shown in FIG. 10B.

In contrast, in a case where the pressure of the pressure chamber 2323 decreases and the pressure receiving plate 2321 moves downward in FIG. 10C, the underside of the pressure receiving plate 2321 contacts the projecting portion 2327A (effort) of the lever 2327 and presses down the lever 2327. The lever 2327 thus rotates about the fulcrum 231P and moves the movable valve 2325 upward. This movement of the valve 2325 makes a gap between the orifice 2320 and the valve 2325 and brings the movable valve 2325 into an open state. While the movable valve 2325 is in the open state, ink flowing from the upstream flow path (not shown) of the pressure control unit 230 passes through the gap between the movable valve 2325 and the orifice 2320, flows into the pressure chamber 2323, and transfers its pressure to the pressure receiving plate 2321. The ink then flows from the pressure chamber 2323 into the common supply path 211 of the head 300 through the downstream flow path (not shown).

In the pressure control unit 230A, the pressure inside the pressure chamber 2323 is determined by the following relational expression showing the balance between the forces applied to the respective parts. The balance between the forces utilizes the principle of leverage. In FIG. 10C, L1 indicates a distance between the fulcrum 231P and a straight line including the line of action of the force of the pressure plate pressing the effort 2327P of the lever. L2 indicates a distance between the fulcrum 231P and a straight line including the line of action of the force pressing the center of the valve element of the movable valve 2325. In the pressure control unit 230A, the following formula (1) is established upon the principle of leverage of the lever 2327 including the distances $L_1$ and $L_2$:

$$(k_d x_d + P2S_d)\times L1 = (-k_v x_v + (P1 - P2)\times S_v)\times L2 \tag{1}$$

Based on the formula (1), the pressure P2 of the pressure chamber 2323 can be expressed as the following formula (2):

$$P2 = (-k_d x_d L1 - k_v x_v L2 + P1S_v L2)/(S_d L1 + S_v L2) \tag{2}$$

Here, P1 is the pressure upstream of the movable valve 2325 (orifice 2320) (such as the liquid passage chamber 2324), P2 is the pressure inside the pressure chamber 2323, $k_d$ is a spring constant of the spring 2326A in the pressure chamber, $x_d$ is a displacement of the spring 2326A in the pressure chamber, $k_v$ is a spring constant of the spring 2326B biasing the valve, $x_v$ is a displacement of the spring 2326B, $S_d$ is an area of a pressure receiving portion of the pressure receiving plate 2321, and $S_v$ is a pressure receiving area of the movable valve 2325.

Further, in a case where a valve resistance of the gap between the movable valve 2325 and the orifice 2320 is defined as R and a flow rate of liquid passing through the orifice 2320 is defined as Q, the following formula (3) is established:

$$P2 = P1 - QR \tag{3}$$

Figure 11:
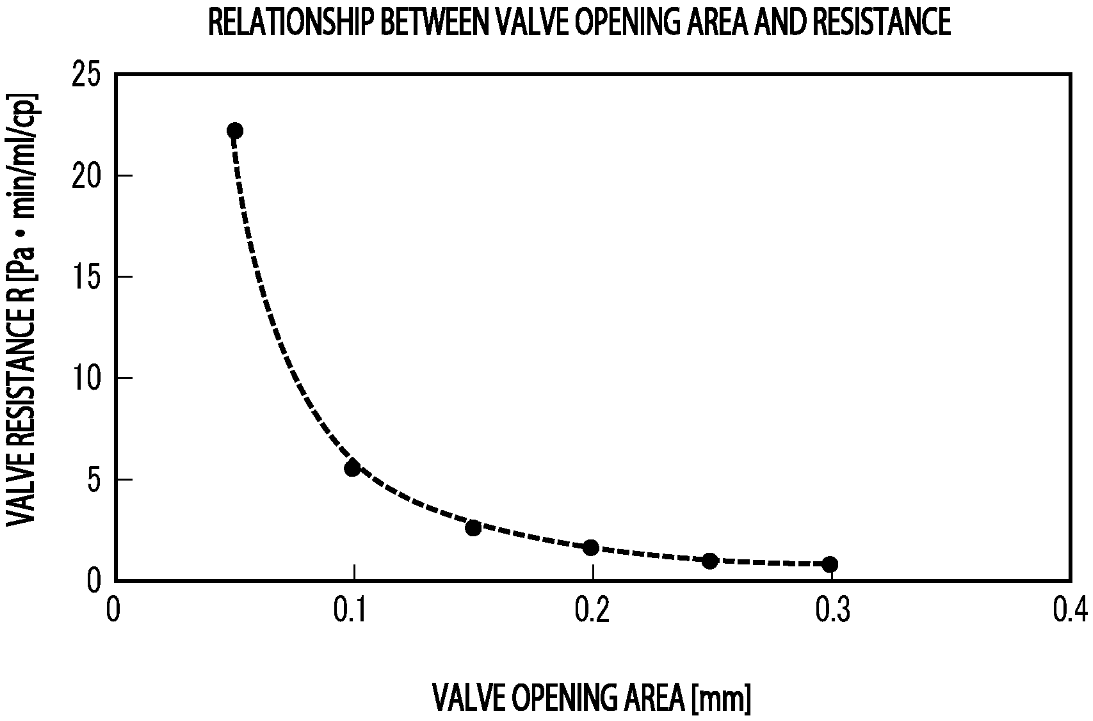
FIG. 11 is a diagram showing a relationship between a valve resistance R and a valve opening area according to the embodiment.

Here, the valve resistance R and a valve opening area (the size of the aforementioned gap) are designed to have a relationship as shown in FIG. 11 for example. That is, the valve resistance R decreases as the valve opening area increases.

In a case where the pressure P2 of the pressure chamber 2323 decreases with the ink ejection operation in the head 300 or the like and reaches a pressure at which the pressure receiving plate 2321 presses down the lever 2327, the lever 2327 rotates about the fulcrum 231P, raises the movable valve 2325, and opens the valve element. This brings about the state shown in FIG. 10C and the pressure control unit 230A performs pressure control for the pressure P2. That is, in this state, pressure control is performed for the pressure P2 to determine the position (opening area) of the movable valve 2325 such that the formulas (2) and (3) are simultaneously satisfied. More specifically, it is assumed that a flow rate Q of ink flowing into the liquid passage chamber 2324 increases while the movable valve 2325 is open. In this case, since the pressure applied by the second pump 1004 that is an upstream pressurization source is constant, the value of the pressure P1 is reduced by the valve resistance increase in the upstream flow path due to the increase in flow rate Q. As a result, the force $P1S_v$ acting in the direction of releasing the movable valve 2325 decreases. At this time, the pressure P2 decreases according to the formula (2). On the other hand, since the valve resistance R=(P1−P2)/Q according to the formula (3), Q increases and the pressures P1 and P2 decrease. However, since the amount of decrease of P1 is larger than that of P2, P1−P2 is reduced and the valve resistance R decreases. In a case where the valve resistance R decreases, the valve opening area increases according to the relationship shown in FIG. 11. That is, the movable valve 2325 moves upward. This movement compresses the spring 2326B. In a case where this displacement is x, the elastic force $k_v x$ of the spring 2326B increases. The pressure P2 thus decreases according to the formula (2). Conversely, in a case where the pressure P1 increases under the influence of the upstream flow rate Q or the like, the pressure P2 increases by the reverse of the above action.

The decrease and increase in the pressure P2 described above are repeated alternately and instantaneously, whereby the pressure P2 converges on a value within a predetermined range. That is, the pressure control unit 230A operates such that both of the formulas (2) and (3) are satisfied while the valve opening area changes with the flow rate Q, and controls the pressure P2 of the pressure chamber 2323 such that the pressure P2 is constant (within a predetermined small range). As a result, the pressure of the common supply flow path 211 of the head 300 communicating with the pressure control unit 230A can be controlled within a certain range. The same goes for the low-pressure pressure control unit 230B; the pressure of the common collection flow path 212 of the head 300 communicating with the pressure control unit 230B can be controlled within a certain range.

Lever Ratio

As described above, the pressure control units 230A and 230B control their respective pressures within a certain range such that an ink circulation flow is produced in the head 300. This generated circulation flow stabilizes the meniscus in the ink ejection opening section and enables excellent ink ejection. In order to control the pressures of the pressure control units 230A and 230B within a certain range, it is preferable to reduce a change amount of the pressure P2 of the pressure chamber 2323 shown by the formula (1). In the present embodiment, the pressure change amount is reduced by optimizing the ratio L1:L2 of the lever 2327 (hereinafter also referred to as "lever ratio" and defined as L1/L2).

The pressure change amount in a case where the ratio L1:L2 is 1:1 to 9:1 (lever ratio=1 to 9) will be described below. A state immediately after the movable valve 2325 is opened is defined as "state 1" and a state in which the pressure P2 has been controlled due to the increase in upstream flow rate Q as described above with the movable valve 2325 open after state 1 is defined as "state 2." A difference between the pressure P2 in "state 1" and the pressure P2 in "state 2" is evaluated as a change amount of the pressure P2.

Parameters of the elements of the pressure control unit 230A are as follows:

$S_d$ diameter: 40 [mm]→$S_d$=1.26×10$^{-1}$ [m$^2$], $S_v$ diameter: 5 [mm]→$S_v$=1.96×10$^{-3}$ [m$^2$], $k_d$: 0.5 [N/mm], $x_d$: 15 [mm]→$k_d \cdot x_d$=7.5 [N], $k_v$:0.1 [N/mm], $x_v$:10 [mm] →$k_v \cdot x_v$=1 [N]

In "state 1," P1=50000 [Pa].

In the case of lever ratio=1 (L1=15 [mm]/L2=15 [mm])

In "state 1," P1=50000 [Pa] and the pressure P2 is P2=−5891 [Pa] according to the formula (2).

In "state 2," the pressure P1 decreases by 20 kPa with the increase in upstream flow rate Q and thus P1=30000 [Pa]. Further, the opening area of the movable valve 2325 changes such that $x_d$=14.9 [mm] and $x_d$=9.9 [mm]. As a result, $P_2$=−6151 [Pa].

In view of the above, with the transition from "state 1" to "state 2," the pressure P2 changes by 261 [Pa] in absolute value.

In the case of lever ratio=2 (L1=20 [mm]/L2=10 [mm])

In "state 1," the pressure P1 is similarly P1=50000 [Pa] and the pressure P2 is P2=−5928 [Pa] according to the formula (2).

In "state 2," the pressure P1 is similarly P1=30000 [Pa]. The opening area of the movable valve 2325 also the same as that in the above case of lever ratio=1. As a result, P2=−6001 [Pa].

In view of the above, with the transition from "state 1" to "state 2," the pressure P2 changes by 73 [Pa] in absolute value.

Figure 12:
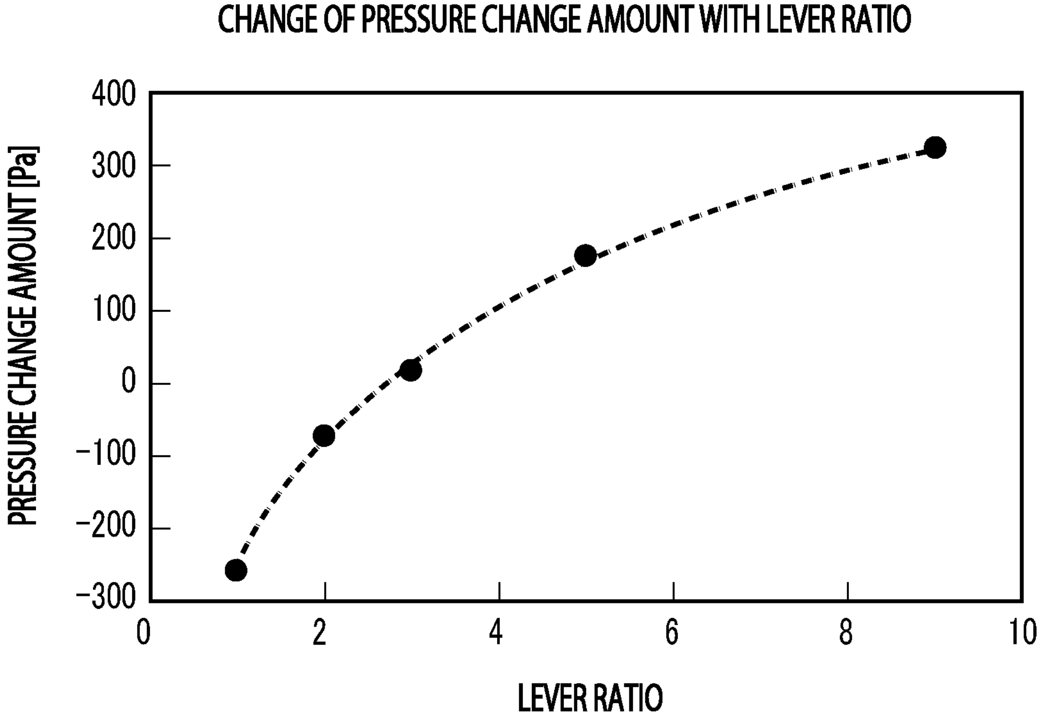
FIG. 12 is a diagram showing a relationship between a lever ratio and a pressure change amount according to the embodiment.

It is understood from the above that the change amount in the case of lever ratio=2 is less than that in the case of lever ratio=1. Similarly, in the cases of lever ratio=3, 5, and 9, the change amounts of the pressure P2 are 18 [Pa], 177 [Pa], and 324 [Pa], respectively, in absolute value. The change is shown in FIG. 12. As can be understood from FIG. 12, the change amount has a minimum value (0 [Pa]) near lever ratio=3.

Within the above range of lever ratio, in a case where the pressure change is equal to or greater than about 200 [Pa], the ejection amount of the ejection head may change relatively largely and the ejected droplets may be dispersed, which may result in a decrease in quality of a printed image. Thus, it is preferable that the lever ratio be greater than 1 and less than 5. It is more preferable that the lever ratio be greater than 2 and less than 4. Within this range, the pressure change can have a relatively small change amount not more than 100 [Pa]. In this manner, the pressure change amount can be reduced by setting the lever ratio within the appropriate range.

Figure 10D:
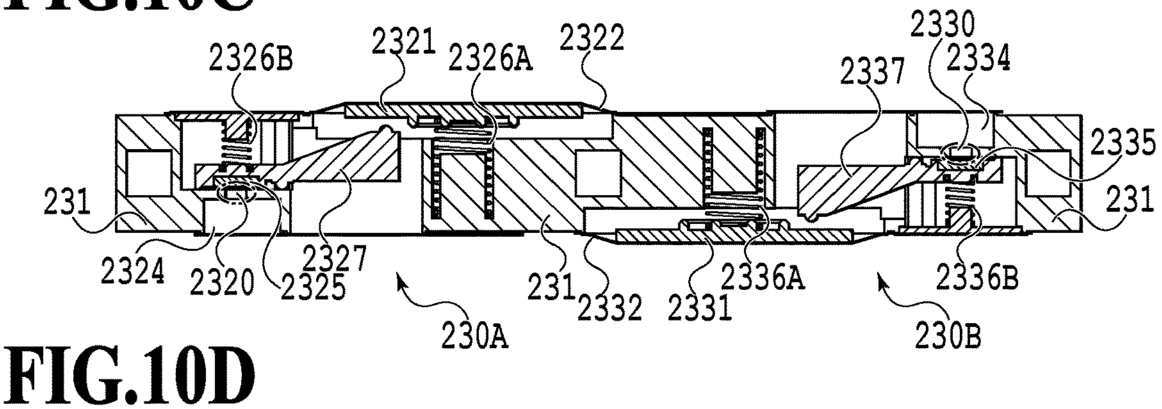

Returning to FIGS. 10A to 10D, FIG. 10D is a cross-sectional view showing the pressure control units of the present embodiment. The pressure control units of the present embodiment are formed by integrating the pressure control units 230A and 230B as described above with reference to FIGS. 10A to 10D and the like. In FIG. 10D, for clarification of the content illustrated, the reference numeral of each element of the pressure control unit 230B such as a lever 2337 is different from that of the corresponding element of the unit 230A only in that "2" in the tens place is replaced with "3." In the following description, the integrated pressure control units 230A and 230B will be also referred to as pressure control mechanisms 230A and 230B.

As shown in FIG. 10D, the two pressure control units 230A and 230B are arranged in a casing 231 such that the arrangement of the elements of one unit is the reverse of that of the other unit and the units are adjacent to each other in the same direction as the ejection opening array direction in the ejection head 300. Space can be saved by thus integrating the two pressure control mechanisms into one unit. In this form, the two pressure control mechanisms can be applied to the same ink as in the present embodiment and controlled at different pressures by, for example, changing the lever ratio as described above. By controlling the pressure control mechanisms at different pressures and connecting them fluidly to the upstream and downstream sides of the ejection openings, respectively, ink can be circulated through the ejection openings and ink solidification can be suppressed in the ejection openings. In particular, in commercial printing requiring a high quality printed article, it is preferable to control both of the pressures upstream and downstream of the ejection openings with high accuracy and maintain the stable ink circulation flow in the ejection openings. Thus, as described above, the pressure change amount of the pressure P2 is preferably equal to or less than 100 [Pa]. That is, it is more preferable to set the lever ratio at a value from 2 to 4.

Incidentally, although the spring 2326 that is a biasing unit comprises two coupled springs (2326A, 2326B) in FIG. 10B, either of the springs may be used because the pressure regulating function is not impaired as long as the composite spring force satisfies a desired negative pressure value.

Other Embodiments

Figure 13:
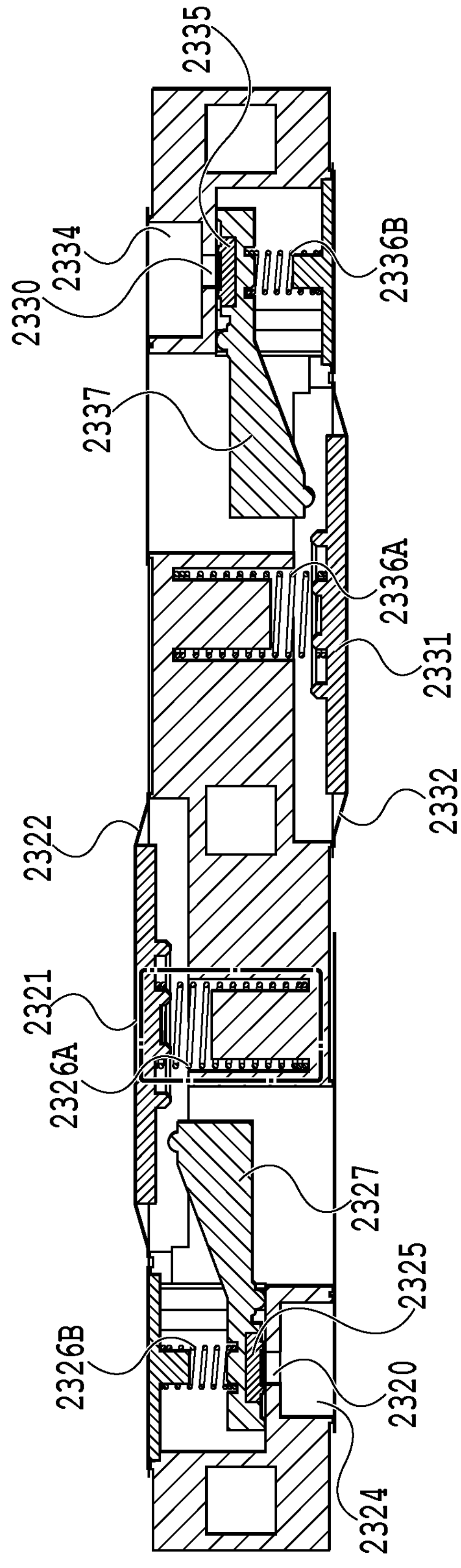
FIG. 13 is a diagram illustrating a change of a spring constant of a spring for use in two pressure control mechanisms according to another embodiment of the present invention.

FIG. 13 is a diagram illustrating a change of a spring constant of a spring for use in two pressure control mechanisms according to another embodiment of the present invention. For example, in a case where a spring constant of the spring 2326A is changed, the value of $k_d$ in the above formula (1) is changed. This makes it possible to control two different pressures without changing the other parts or elements. Incidentally, although the spring 2326 comprises two coupled springs in this example, either or both of the springs may be changed in order to change the spring constant.

A specific example will be described below. On the assumption that the spring constant is $k_d$=$k_1$ in a case where the pressure P2 inside the pressure chamber 2323 is −3000 Pa with respect to the atmospheric pressure in the formula (1), the following formula is established:

$$-3000=(-k_1x_dL_1-k_vx_vL_2+P_1S_vL_2)/(S_dL_1+S_vL_2) \tag{4}$$

According to the formula (4), $k_1$ is expressed by the following formula:

$$k_1=-(-3000\,(S_dL_1+S_vL_2)+k_vx_vL_2-P_1S_vL_2)/x_dL_1 \tag{5}$$

Here, in a case where only the spring constant is changed such that the spring constant is $k_2$ in a case where the pressure P2 inside the pressure chamber 2323 is −5000 Pa with respect to the atmospheric pressure, $k_2$ can be expressed by the following formula like the formula (5):

$$k_2 = -(-5000\,(S_d L_1 + S_v L_2) + k_v x_v L_2 - P_1 S_v L_2)/x_d L_1 \qquad (6)$$

As described above, the pressure control value can be changed by changing the spring constant.

FIG. 14 to FIG. 17B are diagrams illustrating other embodiments in which two different pressures are generated in the two pressure control mechanisms 230A and 230B in the pressure control unit 230 used in the embodiment of the present invention.

Figure 14:
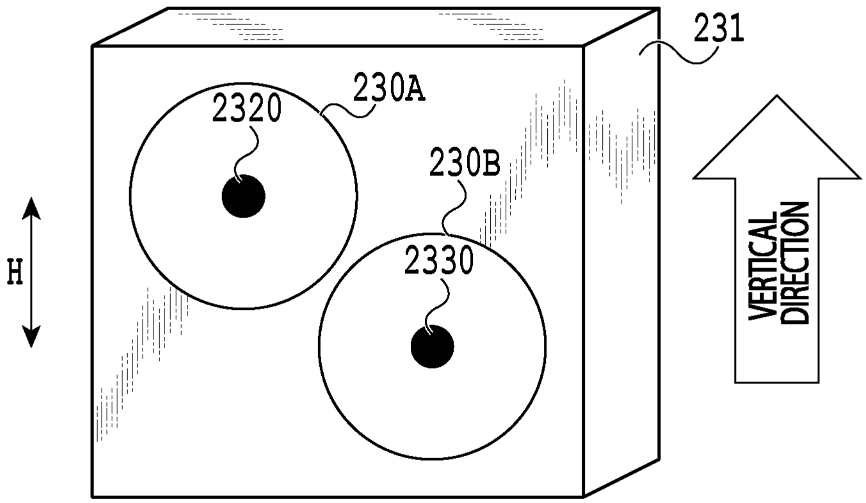
FIG. 14 is a diagram showing an embodiment in which orifices opened and closed by movable valves are provided at different positions in a vertical direction, according to the embodiment.

FIG. 14 shows an embodiment in which the orifices 2320 and 2330 to be opened and closed by the respective movable valves 2325 and 2335 (see FIG. 10D) are provided at different positions in the vertical direction. This arrangement makes a difference H in height between the orifices 2320 and 2330 in the vertical direction. This can make a water head difference with the ejection openings at the time of head driving, which results in a control pressure difference between the pressure control mechanism 230A and the pressure control mechanism 230B. In this embodiment, since the accurate pressure difference can be made by the water head difference, there is a possibility that the factor of a change in pressure difference is reduced.

FIGS. 15A to 15D are diagrams illustrating an embodiment in which a biasing force of the spring 2326B relating to pressure control is changed by changing a length of a spring storage section. Although the springs 2326A and 2326B are two coupled springs in the example shown in these figures, either or both of the spring storage sections may be changed to change a spring storage length L. Here, the spring storage length L indicates a length of a spring in a case where the valve transitions from a closed state to an open state. The spring storage length of the spring 2326A in the pressure chamber 2323 is a length between the pressure receiving plate 2321 and the unit casing 231. The spring storage length of the spring 2326B is a length of a spring storage section between the movable valve 2325 and a spring holder.

Figure 15A:
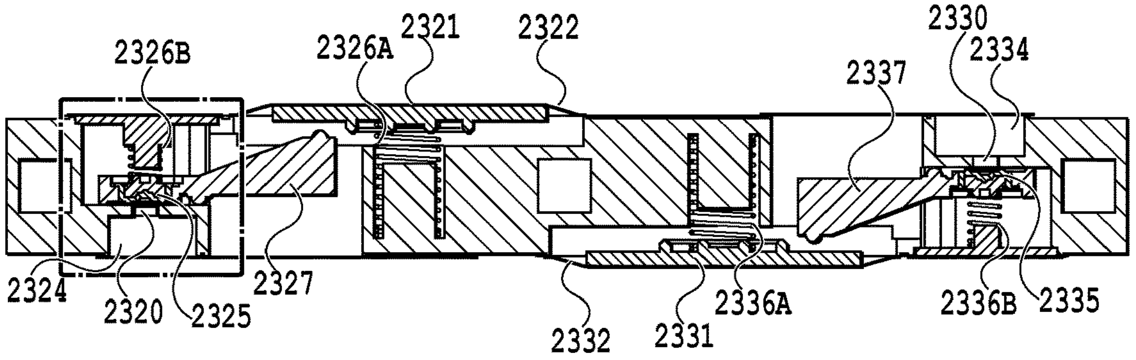
FIGS. 15A to 15D are diagrams illustrating an embodiment in which a biasing force of a spring relating to pressure control is changed by changing a length of a spring storage section.
Figure 15B:
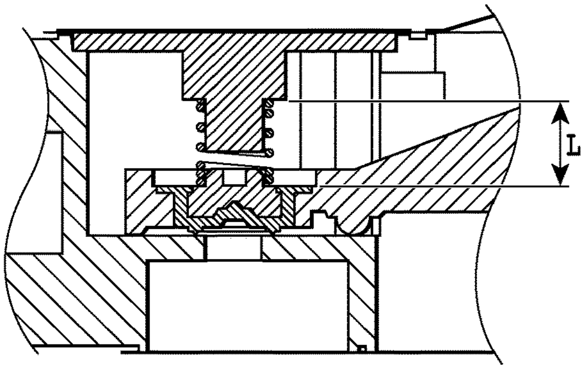
Figure 15C:
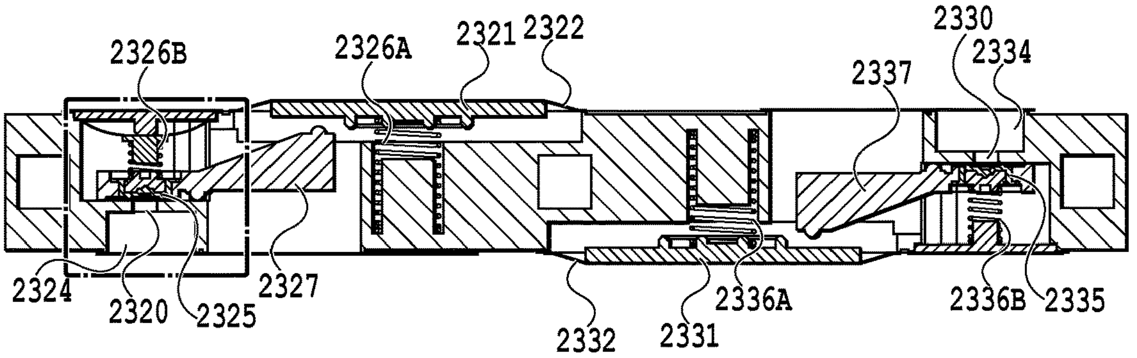

In order to change the spring storage length L, it is only necessary to change either or both of the storage lengths of the springs 2326A and 2326B. There is a method of changing a depth of the spring storage section of the pressure control unit casing 231 or pressure receiving plate 2321 or, as shown in FIG. 15B, a height of the spring storage section of the spring holder or a height between the contact point with the spring pressure control unit casing 231 and the contact point with the spring in a case where the movable valve 2325 is closed.

Figure 15D:
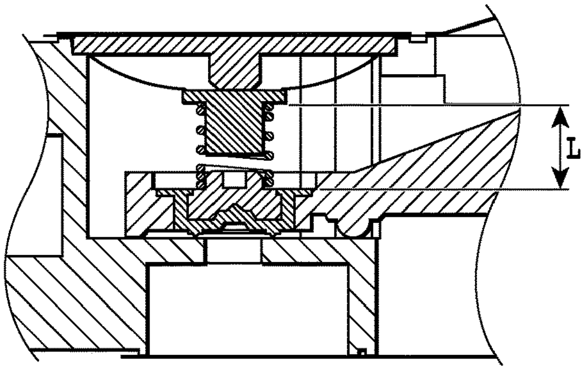

Further, as shown in FIG. 15D, by making the height of the spring storage section of the spring holder adjustable, the pressure control value can be adjusted after the pressure control units 230A and 230B are assembled. That is, since accurate pressure control can be performed, a desired differential pressure can be produced and the ink circulation flow rate in the ejection opening can be adjusted with high accuracy.

Figure 16:
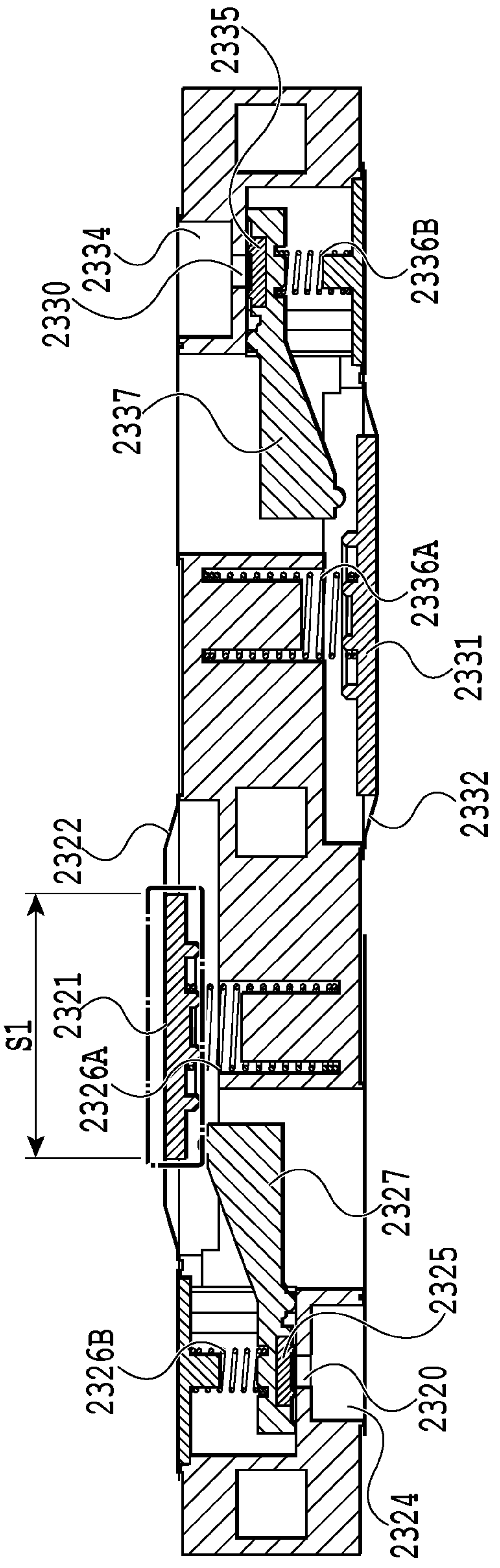
FIG. 16 is a diagram illustrating an embodiment in which an area of a pressure receiving plate receiving a pressure from a pressure chamber is changed.

FIG. 16 is a diagram illustrating an embodiment in which an area of the pressure receiving plate 2321, 2331 receiving a pressure from the pressure chamber 2323, 2333 is changed. The pressure control value can be changed by changing an area S1 of either or both of the pressure receiving plates. By increasing the pressure receiving plate area S1, the influence of the change in upstream pressure P1 can be reduced. Further, the flexible film 2322 is not limited to a flexible film provided that it is fluidly sealable and does not interfere with the movement of the pressure receiving plates 2321 and 2331 or the opening/closing operation of the movable valves 2325 and 2335.

Figure 17A:
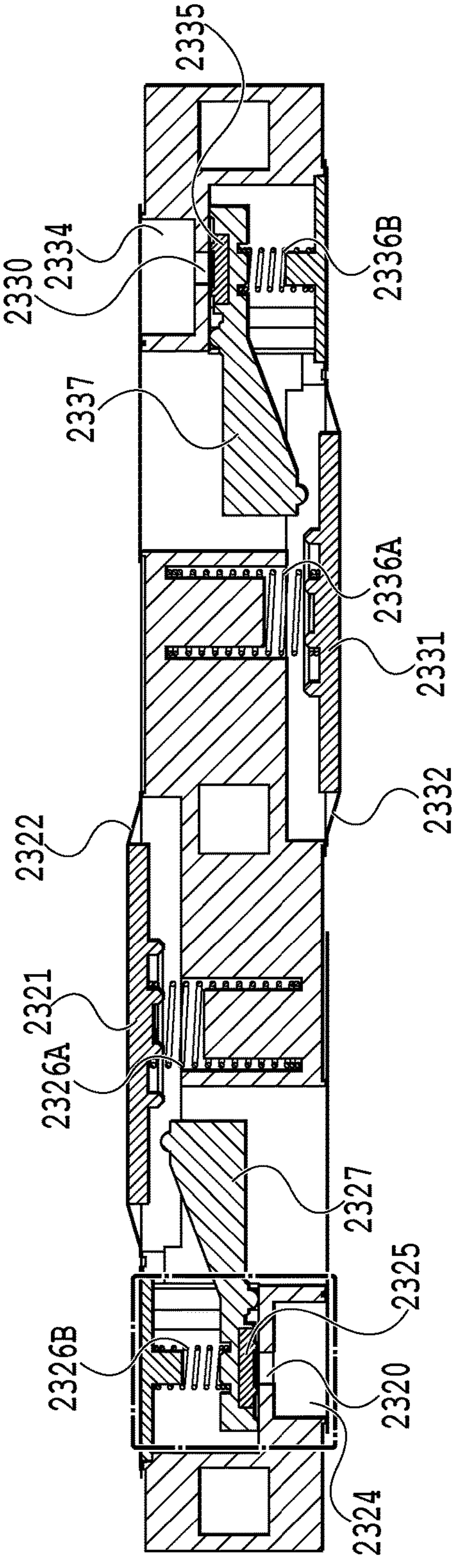
Figure 17B:
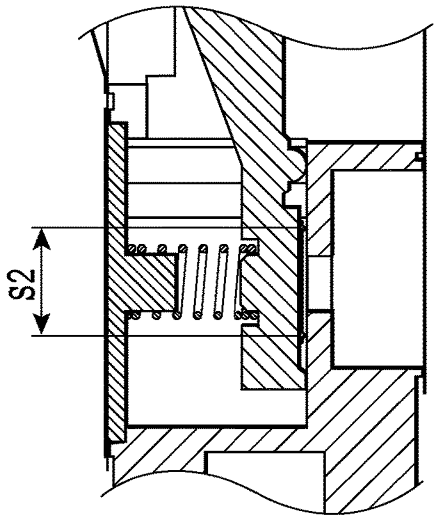

FIGS. 17A and 17B are diagrams illustrating an embodiment in which a pressure receiving area S2 of the movable valve 2325, 2335 is changed. The pressure control value can be changed by changing the pressure receiving area S2 of either or both of the movable valves 2325 and 2335. Here, the pressure receiving area S2 indicates an area surrounded by a portion in contact with the movable valve 2325, 2335 at the time of closing of the gap. A force for moving the movable valve is generated by the pressure of the liquid passage chamber applied on the pressure receiving area S2 of the movable valve 2325, 2335. However, the pressure receiving portion of the movable valve is changed depending on the valve shape. Thus, in a case where the valve has a shape different from that shown in FIGS. 17A and 17B, the pressure receiving area S2 may be different from the above definition. Downsizing of the pressure receiving area S2 of the movable valve leads to downsizing of the pressure receiving plate and the pressure control unit 230A, B.

In a case where the spring constant k is changed as described above, the manufacture of the spring does not require molding and thus there is no need for a mold for molding. Since an increase in cost caused by an increase in the number of types of springs for use can be reduced, it is preferable to change the spring constant k to control the pressure control units at different pressures. Incidentally, the methods described above may be used in combination, not in isolation. The combination of the methods enables the expansion of the pressure-controllable range.

Yet Other Embodiments

In the above embodiments, the pressure control units 230A and 230B are used to make a pressure difference in the ejection head. However, these two pressure control units may correspond to different inks. In this case, the pressure control units can be used for pressure control, for example, in order to form an appropriate meniscus in the ejection heads for the corresponding ink colors.

In addition, the two pressure control mechanisms 230A and 230B arranged in the pressure control unit 230 described above are not necessarily controlled at negative pressures. It is only necessary to control them at such pressures that the ejection openings are maintained under a negative pressure.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

In a liquid ejection apparatus according to an aspect of this disclosure, a pressure of liquid supplied to an ejection head can be maintained at a value within a predetermined range.

This application claims the benefit of Japanese Patent Application No. 2022-203753, filed Dec. 20, 2022, which is hereby incorporated by reference wherein in its entirety.

What is claimed is:

1. A liquid ejection apparatus comprising:

an ejection head configured to eject liquid;

a liquid reservoir storing liquid ejected by the ejection head; and a pressure control mechanism configured to control a pressure of liquid supplied from the liquid reservoir and supply the ejection head with liquid at the controlled pressure through a liquid flow path section, the pressure control mechanism comprising a pressure chamber in liquid communication with the ejection head through the liquid flow path section, a liquid passage chamber configured to receive liquid supplied from the liquid reservoir, a valve element configured to open and close between the pressure chamber and the liquid passage chamber, a lever member connected to the valve element at a load and connectable to a pressure receiving member for a pressure of the pressure chamber at an effort, the lever member being provided rotatably about a fulcrum, and a biasing unit configured to bias the valve element in a closing direction at the load of the lever member, the pressure control mechanism being configured to control a pressure of the pressure chamber, wherein the pressure control mechanism is configured such that a lever ratio, which is a ratio of a distance between the effort and fulcrum of the lever member to a distance between the load and fulcrum of the lever member, is greater than 1 and less than 5.

2. The liquid ejection apparatus according to claim 1, wherein the lever ratio of the lever member is greater than 2 and less than 4.

3. The liquid ejection apparatus according to claim 1, further comprising a first pressure control mechanism and a second pressure control mechanism as the pressure control mechanism, which are each identical to the pressure control mechanism, wherein the first pressure control mechanism and the second pressure control mechanism control pressures of the pressure chambers at different pressures, supply liquid at the controlled pressures to the ejection head, and generate a liquid flow in a pressure generation chamber of the ejection head.

4. The liquid ejection apparatus according to claim 3, wherein the first pressure control mechanism comprises a first biasing unit and a second biasing unit, which are each identical to the biasing unit, and a biasing force of the first biasing unit is different from a biasing force of the second biasing unit.

5. The liquid ejection apparatus according to claim 3, wherein a vertical height of an orifice opened and closed by a first valve element, which is the valve element of the first pressure control mechanism, is different from a vertical height of an orifice opened and closed by a second valve element, which is the valve element of the second pressure control mechanism.

6. The liquid ejection apparatus according to claim 3, wherein a pressure receiving area of a first pressure receiving member, which is the pressure receiving member of the first pressure control mechanism, is different from a pressure receiving area of a second pressure receiving member, which is the pressure receiving member of the second pressure control mechanism.

7. The liquid ejection apparatus according to claim 3, wherein a pressure receiving area of a first valve element, which is the valve element of the first pressure control mechanism, is different from a pressure receiving area of a second valve element, which is the valve element of the second pressure control mechanism.

8. The liquid ejection apparatus according to claim 3, wherein a first lever ratio, which is the lever ratio of the first pressure control mechanism, is different from a second lever ratio, which is the lever ratio of the second pressure control mechanism.

9. The liquid ejection apparatus according to claim 3, wherein the first pressure control mechanism and the second pressure control mechanism control a pressure of the same liquid.

10. A head unit comprising:

an ejection head configured to eject liquid; and a pressure control unit configured to control a pressure of supplied liquid and supply the ejection head with liquid at the controlled pressure through a liquid flow path section, the pressure control unit comprising a pressure chamber in liquid communication with the ejection head through the liquid flow path section, a liquid passage chamber configured to receive the supplied liquid, a valve element configured to open and close between the pressure chamber and the liquid passage chamber, a lever member connected to the valve element at a load and connectable to a pressure receiving member for a pressure of the pressure chamber at an effort, the lever member being provided rotatably about a fulcrum, and a biasing unit configured to bias the valve element in a closing direction at the load of the lever member, the pressure control unit being configured to control a pressure of the pressure chamber, wherein the pressure control unit is configured such that a lever ratio, which is a ratio of a distance between the effort and fulcrum of the lever member to a distance between the load and fulcrum of the lever member, is greater than 1 and less than 5.

11. The head unit according to claim 10, wherein the lever ratio of the lever member is greater than 2 and less than 4.

* * * * *